United States Patent [19]

Kalata

[11] Patent Number: 4,954,975
[45] Date of Patent: Sep. 4, 1990

[54] WEIGH FEEDING SYSTEM WITH SELF-TUNING STOCHASTIC CONTROL AND WEIGHT AND ACTUATOR MEASUREMENTS

[75] Inventor: Paul R. Kalata, Cherry Hill, N.J.

[73] Assignee: K-Tron International, Inc., Pitman, N.J.

[21] Appl. No.: 230,415

[22] Filed: Aug. 10, 1988

[51] Int. Cl.$^5$ ............................ G01G 13/00; B67D 5/14
[52] U.S. Cl. .................................... 364/567; 177/59; 177/66; 222/56; 364/571.01
[58] Field of Search ............... 364/567, 465, 466, 554, 364/568, 510, 151, 565, 571.01; 222/1, 56, 58, 59; 177/59, 60, 63, 64, 66, 71, 114, 119, 121–123; 340/673; 73/861

[56] References Cited

U.S. PATENT DOCUMENTS

| | | | |
|---|---|---|---|
| Re. 32,101 | 4/1986 | Ricciardi et al. | 364/479 |
| 3,116,801 | 1/1964 | Bauder et al. | 177/1 |
| 3,463,979 | 8/1969 | Scobie et al. | 318/565 |
| 3,481,509 | 12/1969 | Marhauer | 222/1 |
| 3,622,767 | 11/1971 | Koepcke | 364/152 |
| 3,633,009 | 1/1972 | Green et al. | 364/554 |
| 3,700,490 | 10/1972 | Hiyosi et al. | 427/10 |
| 3,767,900 | 10/1973 | Chao et al. | 364/151 |
| 3,845,370 | 10/1974 | Mantey | 318/327 |
| 3,876,871 | 4/1975 | Sinner | 364/151 |
| 3,889,848 | 6/1975 | Ricciardi et al. | 222/58 |
| 4,197,576 | 4/1980 | Sanchez | 364/151 |
| 4,301,510 | 11/1981 | Ricciardi et al. | 364/567 |
| 4,384,354 | 5/1983 | Crawford | 364/554 X |
| 4,513,830 | 4/1985 | Persbeck et al. | 177/114 X |
| 4,524,886 | 6/1985 | Wilson et al. | 222/58 |
| 4,528,918 | 7/1985 | Sato et al. | 110/347 |
| 4,545,242 | 10/1985 | Chan | 73/152 |
| 4,577,270 | 3/1986 | Sugano et al. | 364/151 |
| 4,580,698 | 4/1986 | Ladt et al. | 177/122 X |
| 4,730,499 | 3/1988 | Gianella et al. | 73/861 |
| 4,842,162 | 6/1989 | Merkel | 222/1 |

FOREIGN PATENT DOCUMENTS 1255541 12/1971 United Kingdom .

OTHER PUBLICATIONS

Paul R. Kalata, "The Tracking Index: A Generalized Parameter for $\alpha$–$\beta$ and $\alpha$–$\beta$–$\gamma$ Target Trackers", IEEE Transactions on Aerospace and Electronic Systems, vol. AES-20, No. 2, Mar. 1984, pp. 174–182.
T. J. Williams et al., "Progress In Direct Digital Control", Instrument Society of America, Pittsburgh, 1969, pp. 53, 69, 92, 93, 255.
Emanuel S. Savas, Ph.D., "Computer Control of Industrial Processes", 1965, pp. 12–15.

(List continued on next page.)

Primary Examiner—Parshotam S. Lall
Assistant Examiner—Joseph L. Dixon
Attorney, Agent, or Firm—Oliff & Berridge

[57] ABSTRACT

A weigh feeding system using a stochastic controller wherein the weight of material and the position of a material discharge actuator are sensed, and an estimate of the mass flow state of the material being discharged is created by use of a Kalman filter process. Plant noise processes and measurement noise processes, which affect the measured weight and actuator position signal, are modeled as stochastic processes and are used, in combination with the sensed weight and actuator position signals, to calculate the estimated mass flow state. The noise models are modified to account for disturbances. The estimated mass flow state signal is used to calculate a motor feedback signal which, in turn, is used to control the speed of the discharge apparatus. In this manner, the mass flow of the material actually being discharged is driven to a desired mass flow with minimum error variance in the presence of unavoidable plant and measurement noise. Self-tuning of the stochastic controller is employed to accurately determine parameters of the plant noise and measurement noise processes, and to compensate the controller for control dynamics. Feedback control tuning is also employed to monitor the set-point error in order to achieve quick response while maintaining smooth steady-state set point control.

10 Claims, 13 Drawing Sheets

OTHER PUBLICATIONS

J. S. Meditch, "Stochastic Optimal Linear Estimation and Control", Boeing Scientific Research Laboratories, pp. 1-394, 1969.
Andrew P. Sage, et al., "Optimum Systems Control", Second Edition, 1977, pp. 1-413.
Andrew P. Sage, et al., "Estimation Theory with Applications to Communications and Control", 1971, pp. 1-529.
Robert F. Stengel, "Stochastic Optimal Control", Theory and Application, 1986, pp. 1-638.
Paul R. Kalata, "Rapid Identification on Low Velocity Radar Tracks", Modeling and Simulation, vol. 12, part 4, 1981, pp. 1443-1447.
Stanley M. Shinners, "Control System Design", 1964, pp. 1-523.
Kalata et al., "Stochastic Control of Loss-in-Weight Feeding Machines," Proceedings IEEE International Symposium on Intelligent Control, Jan. 1987, pp. 495-500.
Friedland, "Estimating Noise Variances by Using Multiple Observes," IEEE Transactions on Aerospace and Electronic Systems, vol. AES-18, No. 4, Jul. 1982, pp. 442-448.

WEIGH FEEDING SYSTEM WITH SELF-TUNING STOCHASTIC CONTROL AND WEIGHT AND ACTUATOR MEASUREMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention pertains to weigh feeding systems.

The present invention uses a Kalman filtering process to develop filtered estimates of the actual weight state and the mass flow state. These filtered estimates are used, in combination with modeling and classification of the plant and measurement noise processes which affect weight measurements and discharge actuator measurements, to control the actual mass flow state. The class of noise is determined, and a stochastic model for each class is created. The estimated mass flow signal is produced based on the measured weight and measured actuator position or velocity, and based on the stochastic models of the individual noise processes affecting the system. The noise process models are modified according to the magnitude of their effects and probability of occurrence.

The estimated mass flow state signal is then compared with a desired mass flow set-point, and the resultant error signal is used to control the discharge actuator to produce the desired mass flow.

The present invention also employs self-tuning of parameters associated with the noise processes which affect the weight measurements and discharge actuator measurements and self-tuning of control parameters in order to compensate the Kalman filter states due to the effects of control dynamics. This noise model tuning and control model tuning allow the Kalman filter to operate optimally. In addition, feedback control tuning is employed to monitor the set point error and to generate adaptive dynamics to achieve a quick response while maintaining a smooth steady-state set point control.

DESCRIPTION OF THE PREFERRED EMBODIMENT

Figure 1:
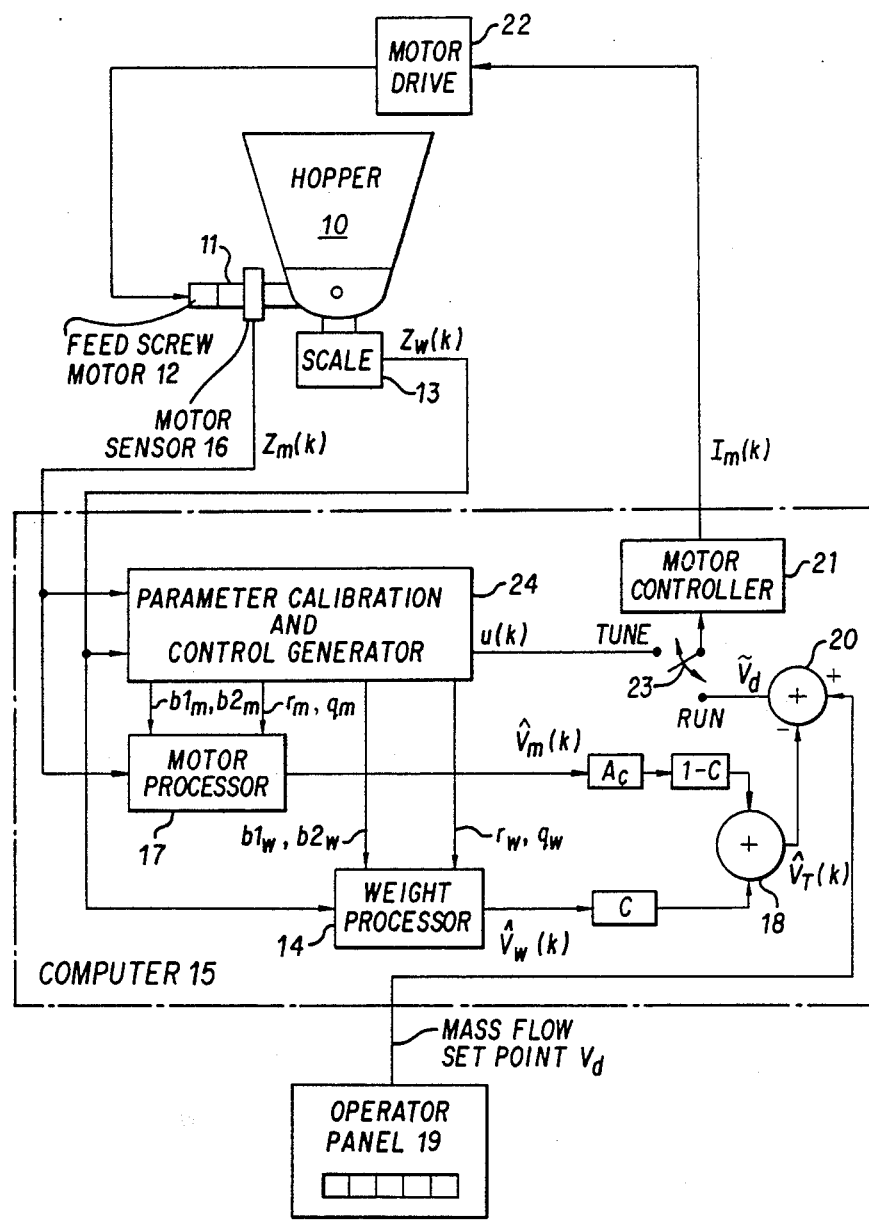
FIG. 1 is a loss-in-weight feeding system embodying the present invention.

In the present weigh feeding system, solid or liquid material stored in a hopper or other container is discharged by a conventional discharge actuator such as a screw feeder, conveyor, pump, valve or the like as appropriate. The discharge actuator is typically driven by an electric motor. The system also includes a weight sensing device, such as a scale, for sensing the weight of the material in the hopper or the material being discharged, and for producing a signal indicative of the sensed weight state, and a discharge actuator position sensor, such as a motor shaft position encoder, for sensing the position state of the discharge actuator. The signals produced by the weight sensing device and the discharge actuator position sensor are applied to respective signal processors which, in turn, produce signals which are combined to provide an estimate of the weight rate state or mass flow state of material being discharged. The estimate of mass flow state is then used in a feedback loop to control the motor to drive the estimated mass flow state to a desired set-point mass flow.

Other weigh feeding systems using stochastic control with weight sensing only include U.S. Pat. No. 4,775,949 (Ser. No. 879,430, filed June 27, 1986), and Ser. No. 344,458, filed Apr. 28, 1989, continuation of Ser No. 174,976, filed Mar. 29, 1988, the disclosures of each of which are expressly incorporated herein by reference. Each of these prior applications was invented by the present inventor, and each is assigned to the same assignee as the present application.

Throughout the present specification, different symbols are used to represent various physical and calculated quantities. Table I lists these symbols in the left-hand column, their meaning in the middle column, and the corresponding variable name used in the source code program listed at the end of the specification in the right-hand column. The notation "nip" or "not in the program" means that the symbol is used in the text of this application but not in the program listing.

TABLE I

| Symbol | Meaning | Program Variable |
|---|---|---|
| $I(k)$ | motor signal | I |
| $u(k), V_c$ | control input to system | VCTEMP |
| $x(k)$ | position state | nip |
| $v(k)$ | velocity state | nip |
| $z(k)$ | measurement | nip |
| $w(k)$ | plant noise | nip |
| $w_1(k)$ | position state noise | nip |
| $w_2(k)$ | velocity state noise | nip |
| $n(k)$ | measurement noise | nip |
| $b_{1,w}$ | position compensation factor of weight | SSWCOMPF |
| $b_{1,m}$ | position compensation factor of motor | MPSSWCOMPF |
| $b_{2,w}$ | small signal velocity gain of weight | SSVCGAIN |
| $b_{2,m}$ | small signal velocity gain of motor | MPSSVCGAIN |
| $r_w$ | variance of weight measurement noise | NSIG2 |
| $r_m$ | variance of motor measurement noise | MPNSIG2 |
| $Q$ | covariance of $w(k)$ | nip |
| $q_{1,w}$ | variance of $w_1(k)$ of weight | Q11 |
| $q_{1,m}$ | variance of $w_1(k)$ of motor | MPQ11 |
| $q_{2,w}$ | variance of $w_2(k)$ of weight | VSIG2 |
| $q_{2,m}$ | variance of $w_2(k)$ of motor | MPVSIG2 |
| $A_c$ | correlation factor | ACORR |
| $n_c(k)$ | correlation noise | nip |
| $\sigma_{nc}^2$ | variance of $n_c(k)$ | SIGNC2 |

TABLE I-continued

| Symbol | Meaning | Program Variable |
|---|---|---|
| C | combining coefficient | AT |
| $X_w$ | position estimate of weight | XHAT |
| $X_m$ | position estimate of motor | MPHAT |
| T | time between measurements | TD |
| $V_w$ | velocity estimate of weight | VHAT |
| $V_m$ | estimate of motor rate | VMPHAT |
| V(k) | velocity estimate error | nip |
| $\sigma_{v,w}^2$ | variance of velocity error $V_w(k)$ of weight | P22 |
| $\sigma_{v,m}^2$ | variance of velocity error $V_m$ of motor | MPP22 |
| $V_T$ | combined weight rate estimate | VHATTOTAL |
| $V_d$ | desired set point | VDESIRE |
| $\tilde{V}_d$ | set point error | VCERROR |
| $\sigma_{v/m}^2$ | variance of $v_{w/m}$ | nip |
| $G_c$ | control gain | CGAIN |

Referring to FIG. 1, a weigh feeding system according to the present invention is shown. Material stored in hopper 10 is discharged by feed screw 11 driven by feed screw motor 12. Scale 13 measures the combined weight of hopper (with material) 10, feed screw 11, and motor 12 to produce a measured weight signal $Z_w$. It will be understood that in a conveyer weigh feeder, scale 13 would sense the weight of material being discharged upon at least a portion of the length of the conveyer. Signal $Z_w$ is applied to weight signal processor 14 in computer 15 which produces an estimate, $\hat{V}_w$, of the mass flow state of material based upon the measured weight $Z_w$. Also, motor position sensor 16 measures the shaft position of the motor which is coupled to the feed screw 11 to produce a measured motor signal $Z_m$. In the preferred embodiment, sensor 16 includes a pick-up coil which senses the passing of teeth of a gear that rotates with the motor shaft driving the feed screw 11 to produce a stream of pulses of variable frequency which can be counted and processed to determine rotational speed of feed screw 11. It will be understood that sensor 16 can be of any type and may be coupled directly or indirectly with the motor as long as it produces a signal which is correlated with actual mass flow. For example, sensor 16 can be an optical or Hall sensor in the case of a rotating prime mover, or can be a proximity sensor in the case of a vibrating prime mover. In addition, instead of sensing the position of the discharge actuator, sensor 16 could be a tachometer, or the like, which measures the velocity of the actuator. Signal $Z_m$ is applied to motor signal processor 17 in computer 15 which produces an estimate, $\hat{V}_m$, of the actuator rate based on measured motor signal $Z_m$.

Mass flow estimates $\hat{V}_w$ and $\hat{V}_m$ are combined by using correlating factor $A_c$, combining coefficient C, and summing junction 18 to produce combined mass flow estimate, $\hat{V}_T$. An operator enters a desired mass flow set-point $V_d$ through control panel 19. The estimated mass flow state $\hat{V}_T$ is compared with the desired mass flow $V_d$ by summing junction 20 to produce an error signal state $\tilde{V}_d$. The error signal state is used by motor controller 21 to calculate a motor control signal $I_M$ which is applied to motor drive 22. The estimated mass flow state $\hat{V}_T$, and the actual mass flow, are thus driven to the desired set-point $V_d$.

Weight sensor 13 and motor sensor 16 are subject to random and systematic instrument and phenomenon errors. The sensors produce erroneous results not only because of internal electronic noise, but also because of the physical inertia of the sensors and the effects of external electronic noise.

In addition, the physical plant including the material hopper, feed screw and motor are also susceptible of disturbance. These plant disturbance processes include: vibrational noise due to the mechanical movement of the feeding screw or material mixer contained within the hopper; varying or non-uniform output feed due to lumpy material, material bridges or non-uniform screw discharge; refilling of the hopper with material at times and at refill rates that are uncertain; unintentional aperiodic superimposed hopper disturbances such as bumping the feeder, or dropping or lifting extraneous weights such as tools; and periodic and aperiodic disturbances of the hopper due to environmental effects such as wind, neighboring machines or passing vehicles.

In general then, a weight measurement yields only crude information about a loss-in-weight feeding system's behavior and, by itself, may be unsatisfactory for assessing the system's states and ultimately controlling the mass flow, particularly during an operational set point change. Thus, additional information about the mass flow rate is obtained from a second sensor mounted to the motor/actuator which measures the rotational position of the actuator. Processing the sensed motor position signal, using a process similar to that used for the sensed weight signal, produces a motor rate estimate which is correlated to the weight rate, and which is independent of the estimate of weight rate derived from the sensed weight signal. Combining the two weight rate estimates, according to the present invention, yields an improved estimate of actual weight rate.

In order to facilitate the calculation of the various operational parameters used by weight processor 14 and motor processor 17, self-tuning is used to control the feeding process to generate data from which these various operational parameters can be calculated. In the general self-tuning process of the present invention, when a weigh feeding machine is first started, or when a dramatic change in operating conditions is presented (for example, changing the type of material being fed), the feeding machine is set to a calibration or tune mode shown schematically by switch 23. In the calibration mode, system calibration processor and control generator 24 causes a series of control signals u(k) to be applied to the weigh feeder, and the weigh feeder reacts to the control sequence u(k). Weight sensor 13 generates a corresponding motor measurement sequence $Z_w(k)$ and motor sensor 16 generates a corresponding weight measurement sequence $Z_m(k)$. The input/output signals $u(k)/Z_w(k)$ and $u(k)/Z_m(k)$ are then used by the system calibration processor and control generator 24 to estimate the noise and control parameters, for example. Then, the estimated parameters are sent to the signal processors 14 and 17, the calibration mode is exited (shown schematically by moving switch 23 from tune to run) and closed-loop control begins.

Figure 2:
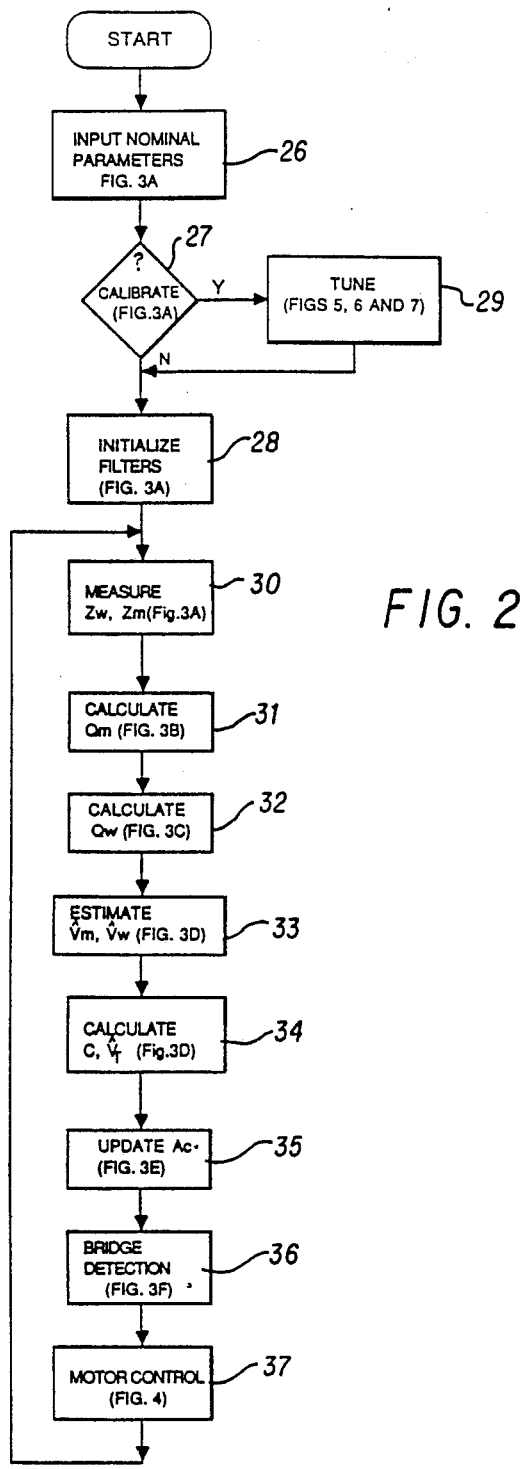
FIG. 2 is a flow chart of the overall flow of control of the present invention.

Referring to FIG. 2, the process steps executed by signal processors 14 and 17 (FIG. 1) are shown. The specific process steps are shown in more detail in the flow charts of FIGS. 3A-3F and FIGS. 4-7.

After the process is started, nominal parameter values and nominal variable values are initialized in block 26 by, for example, operator entry or retreival from memory. Control then passes to decision block 27 where it is determined whether or not the weigh feeder should be calibrated. If calibration is not necessary, for example, if the parameters entered or retrieved from memory in block 26 are known to be accurate, control passes from block 27 to block 28. If, however, calibration is necessary, control passes to block 29 where calibration of parameters is performed. In block 28, the Kalman filters (signal processors 14 and 17, FIG. 1), are initialized and control then passes to block 30 where measurements $Z_w(k)$ and $Z_m(k)$ are retrieved from sensors 13 and 16. Control then passes sequentially through blocks 31 and 32 where noise covariance matrices $Q_m$ and $Q_w$ are calculated. Then, in block 33, rate estimates $\hat{V}_m$ and $\hat{V}_w$ are obtained. Control then passes to block 34 where combining coefficient C is recalculated, and a total weight rate estimate, $\hat{V}_T$, is also calculated. Control then passes to block 35 where correlation factor, $A_c$, is updated. Then in block 36, it is determined whether or not a bridge in the material being fed has formed. Finally, in block 37, motor control signal, I(k), is calculated and is output to control the speed of the motor/actuator. Control is then returned back to block 30 for new measurements, and control continues cyclically thereafter.

Turning now to the detailed flow charts of FIGS. 3A-3F, after the process is started, the following parameters are initialized in step 38.

$V_d$—the desired mass flow set point;
T—the sensor sampling period for $Z_2, Z_m$;
$G_c$—the gain constant of the motor controller;
$r_m$—the initial value for the motor measurement noise variance;
$r_w$—the initial value for the weight measurement noise variance;
$q_{2,m}$—the initial value for the motor plant noise variance;
$q_{2,w}$—the initial value for the weight plant noise variance;
FF—the feed factor of the screw motor.

Figure 5:
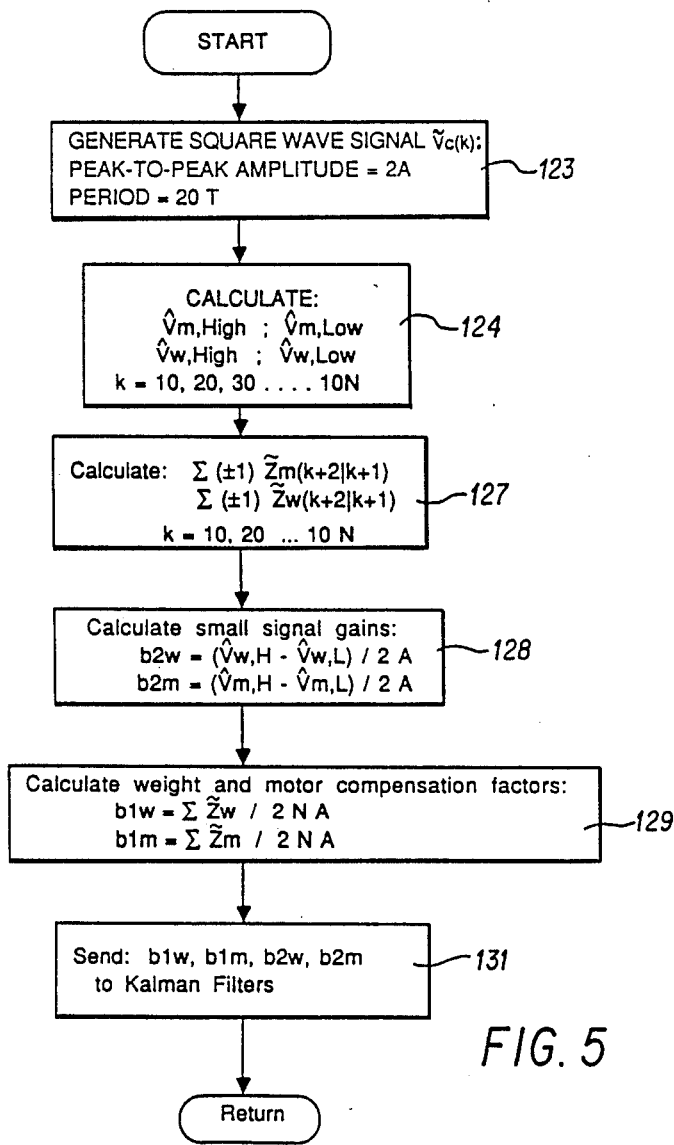
FIG. 5 is a flow chart of the computational steps performed by the present invention to calibrate control parameters.
Figure 6:
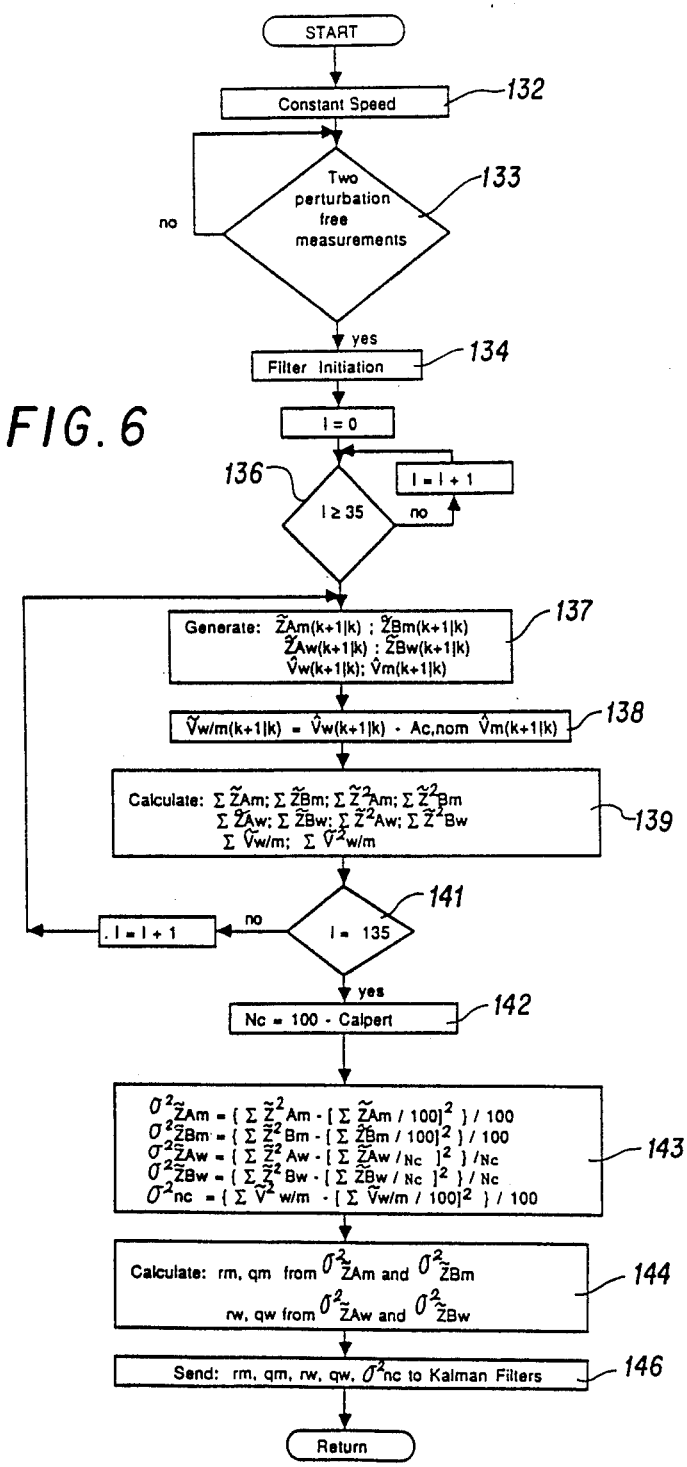
FIG. 6 is a flow chart of the computational steps performed by the present invention to calibrate noise parameters with data editing.
Figure 7:
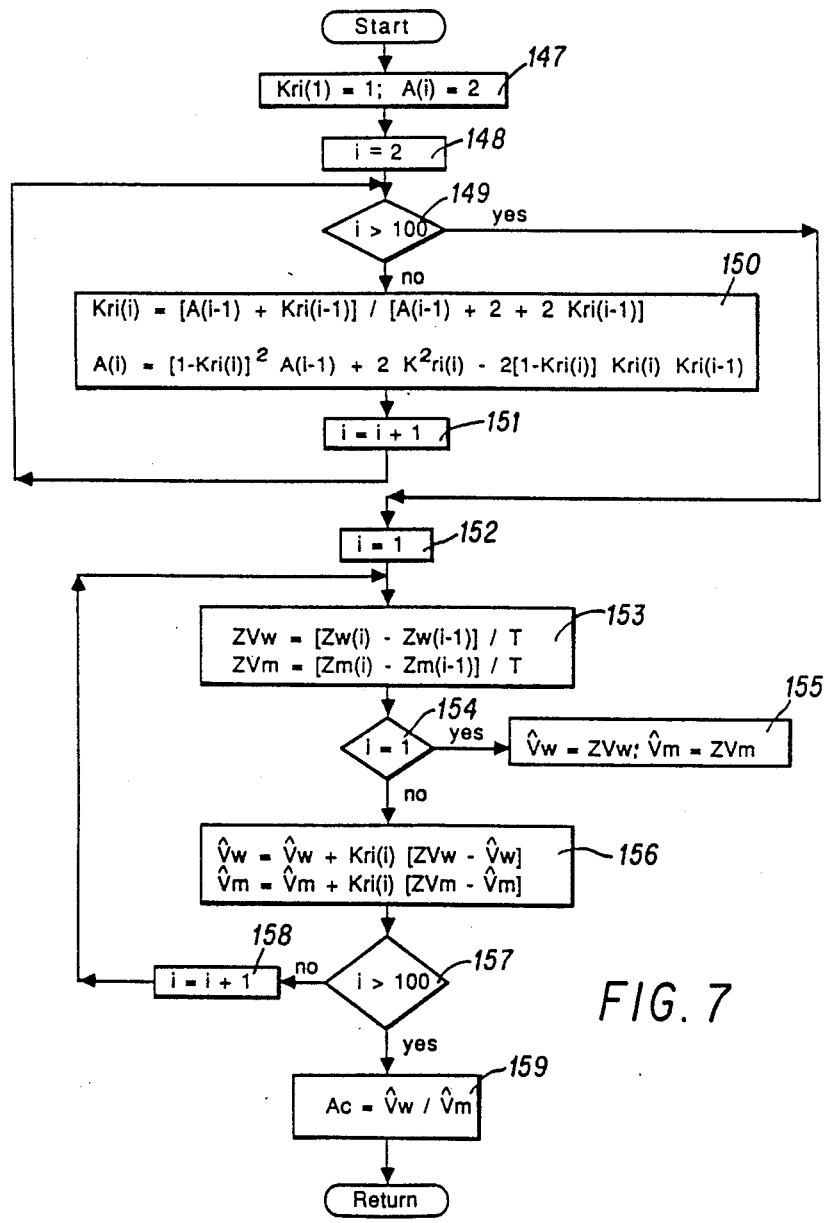
FIG. 7 is a flow chart of the computational steps performed by the present invention to determine the correlation coefficient.

Although not shown, also within block 38 various flags and counters are set to appropriate initial values. Then, control passes to block 27 where it is determined whether or not the parameters entered in block 38 should be calibrated. If so, control passes to blocks 39, 40 and 41 where the calibration procedures shown in detail in FIGS. 5, 6 and 7 are respectively performed. After calibration is complete, or if calibration is not required, control passes to block 42 where the following system variables are initialized:

$u_{1,m}$, $u_{2,m}$—motor controls effecting weight and mass flow, respectively, calculated from motor sensor;
$u_{1,w}$, $u_{2,w}$—motor controls effecting weight and mass flow, respectively, calculated from weight sensor.

Also in step 42, feed screw motor signal, $I_M$, is initialized at a desired level so that the motor is initially moving at a desired speed. In the alternative, signal $I_M$ may be initialized to 0 so that the motor is initially stationary.

In step 43, counter k is set to 0, and control is transferred to step 44 where the first samples $Z_m(1)$ and $Z_w(1)$ are taken. Control is then transferred to decision block 45 where, if k+1 is greater than 2, indicating that the filters have already been initialized, control is transferred to the process steps of FIG. 3B. Otherwise, control is transferred to decision block 46 where, if k+1 is not equal to 2, control is transferred to block 47 and counter k is incremented. Additional samples are then taken in block 44. If decision block 46 decides that k+1 is equal to 2, control is transferred to block 48 where initialization of the filters is begun.

In block 48, the initial weight state estimate based on weight measurements is set to the measured weight at time k=2, $Z_w(2)$. Similarly, the initial motor state estimate based on motor measurements is set to the measured motor position at time k=2, $Z_m(2)$. In addition, the initial motor rate state estimate based on weight measurements, $\hat{V}_w$, is set to the difference between the first two weight measurements divided by the sampling period T, and the initial mass flow estimate based on motor measurements, $\hat{V}_m$, is set to the difference between the first two motor measurements divided by the sampling period T.

Thus, the initial estimates for weight and mass flow states and for motor position and motor rate, based on measured weight and based on measured motor position, are found using the last weight and motor signals and their simple time derivatives. Also in block 48, the predicted estimate of weight state at time k=3 is set to the estimated weight state at time k=2 plus T multiplied by the estimated mass flow state at time k=2. Similarly, the predicted estimate of motor position at time k=3 is set equal to the estimated motor position at time k=2, plus T multiplied by the estimated motor rate at time k=2. Also, the predicted estimate of mass flow state and predicted estimate of motor rate, based respectively on weight and motor measurements at time k=3, are set to the respective estimated mass flow and motor rate at time k=2.

After the estimates and predictions of states are initialized in block 48, control is transferred to block 49 where the entries of the error covariance matrices $P_m$ and $P_w$ are initialized.

The error covariance matrices Pm and Pw take the forms:

$$P_w = \begin{bmatrix} \sigma_{\tilde{x},w^2} & \sigma_{\tilde{x},\tilde{w},\tilde{v},w^2} \\ \sigma_{\tilde{x},\tilde{w},\tilde{v},w^2} & \sigma_{\tilde{v},w^2} \end{bmatrix} ; \text{ and}$$

$$P_m = \begin{bmatrix} \sigma_{\tilde{x},m^2} & \sigma_{\tilde{x},m,\tilde{v},m^2} \\ \sigma_{\tilde{x},m,\tilde{v},m^2} & \sigma_{\tilde{v},m^2} \end{bmatrix}$$

where:
$\sigma_{\tilde{x},w^2}$ is the variance of the weight error based on weight measurement;
$\sigma_{\tilde{v},w^2}$ is the variance of the weight rate error based on weight measurements;
$\sigma_{\tilde{x},w,\tilde{v},w^2}$ is the covariance of the weight and mass flow errors;
$\sigma_{\tilde{x},m^2}$ is the variance of the motor position error based on motor position measurements;
$\sigma_{\tilde{v},m^2}$ is the variance of the motor rate error based on motor position measurements; and
$\sigma_{\tilde{x},m,\tilde{v},m^2}$ is the covariance of the motor position and motor rate errors.

After error covariance matrices $P_w$ and $P_m$ are initialized in block 49, control is transferred to block 47 where counter k is incremented and the next samples are taken in block 44. Once the filters are initialized, k+1 will be greater than 2 and decision block 45 will transfer control to block 51 of FIG. 3B.

In block 51, motor plant noise covariance matrix $Q_m(k)$ is set equal to $Q_{0,m}$ where:

$$Q_{0,m} = \begin{bmatrix} 0 & 0 \\ 0 & q_{2,m} \end{bmatrix}.$$

Control is then transferred to block 52, where a motor measurement residual, $\tilde{Z}_m$, is calculated in using the equation:

$$\tilde{Z}_m(k+1/k) = Z_m(k+1) - \hat{X}_m(k+1/k)$$

where:

$\tilde{Z}_m(k+1/k)$ is the motor measurement residual at time $k+1$ given motor measurements up to and including time k;

$Z_m(k+1)$ is the motor position measurement at time $k+1$; and $\hat{X}_m(k+1/k)$ is the estimated motor position at time $k+1$ given measurements up to and including time k.

Control then transfers to block 53 where motor error covariance matrix $P_m$ is updated using the matrix equation:

$$P_m(k+1/k) = F\,P_m(k/k)F' + Q_m(k)$$

where:

$$F = \begin{bmatrix} 1 & T \\ 0 & 1 \end{bmatrix};$$

F' is the transpose of F; and $Q_m(k)$ is the motor plant noise covariance matrix at time k.

Control is then transferred to block 54 where the motor measurement residual variance is calculated using the matrix equation:

$$\sigma\tilde{z},m^2 = H\,P_m H' + r_m$$

where:

H = [1 0];

H' is the transpose of H;

$P_m$ is calculated in block 53; and $r_m$ is the motor measurement noise variance.

Control then passes to decision block 56 where the square of the motor measurement residual, calculated in block 52, is compared with nine times the motor measurement residual variance calculated in block 54. If the square of motor measurement residual is greater than nine times the motor measurement residual variance, control passes to block 57 where $q_{1,m}$ is set equal to four times the square of the measurement residual variance calculated in block 52 divided by 12. It is to be noted that $q_{1,m}$ is the 11 entry of the $Q_m$ matrix, i.e.:

$$Q_m = \begin{bmatrix} q_{1,m} & 0 \\ 0 & q_{2,m} \end{bmatrix}.$$

From block 56 control passes back to block 53 where the motor error covariance matrix $P_m$ is recalculated using the new value for $Q_m$. Also on the second back pass through block 54, the motor measurement residual variance is recalculated. On the second pass through decision block 56, the measurement residual variance should be large enough so that control passes from block 56 to block 58 in FIG. 3C.

Thus, the magnitude of the motor measurement residual is compared against a quantity calculated from the variance of the motor measurement residual, and if the motor measurement residual is large enough, the motor plant noise covariance matrix $Q_m$ is changed to reflect the larger motor measurement residual. This adjustment aids in the accommodation of large perturbations which affect the motor measurements.

Figure 3A:
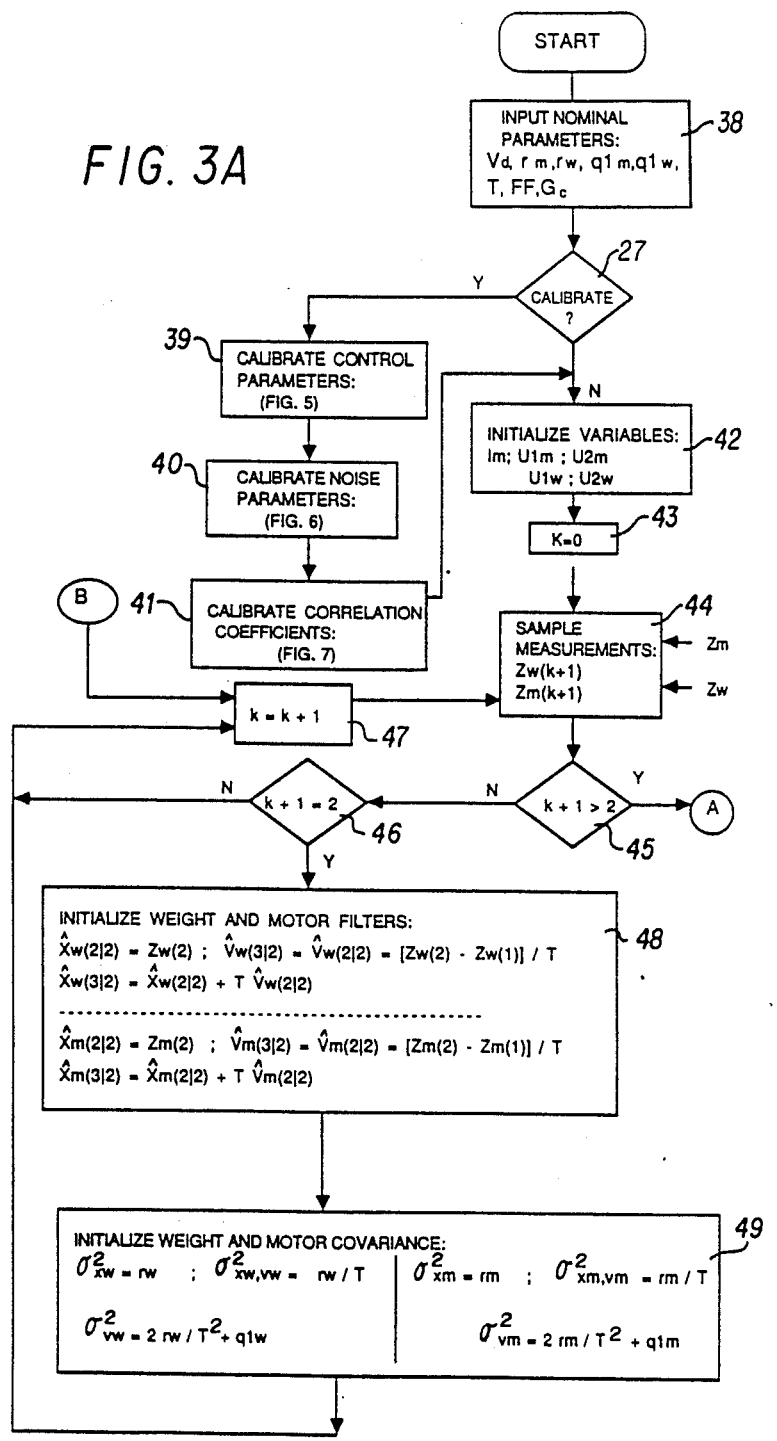
FIG. 3A-3F are a flow chart of the computational steps performed by the weight signal processor and motor signal processor of the present invention.
Figure 3B:
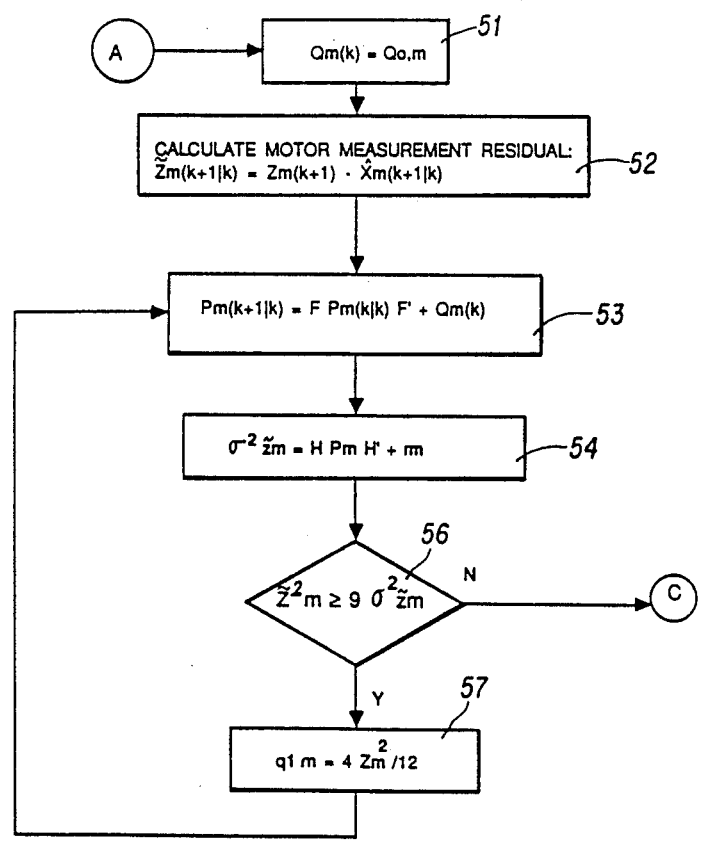
Figure 3C:
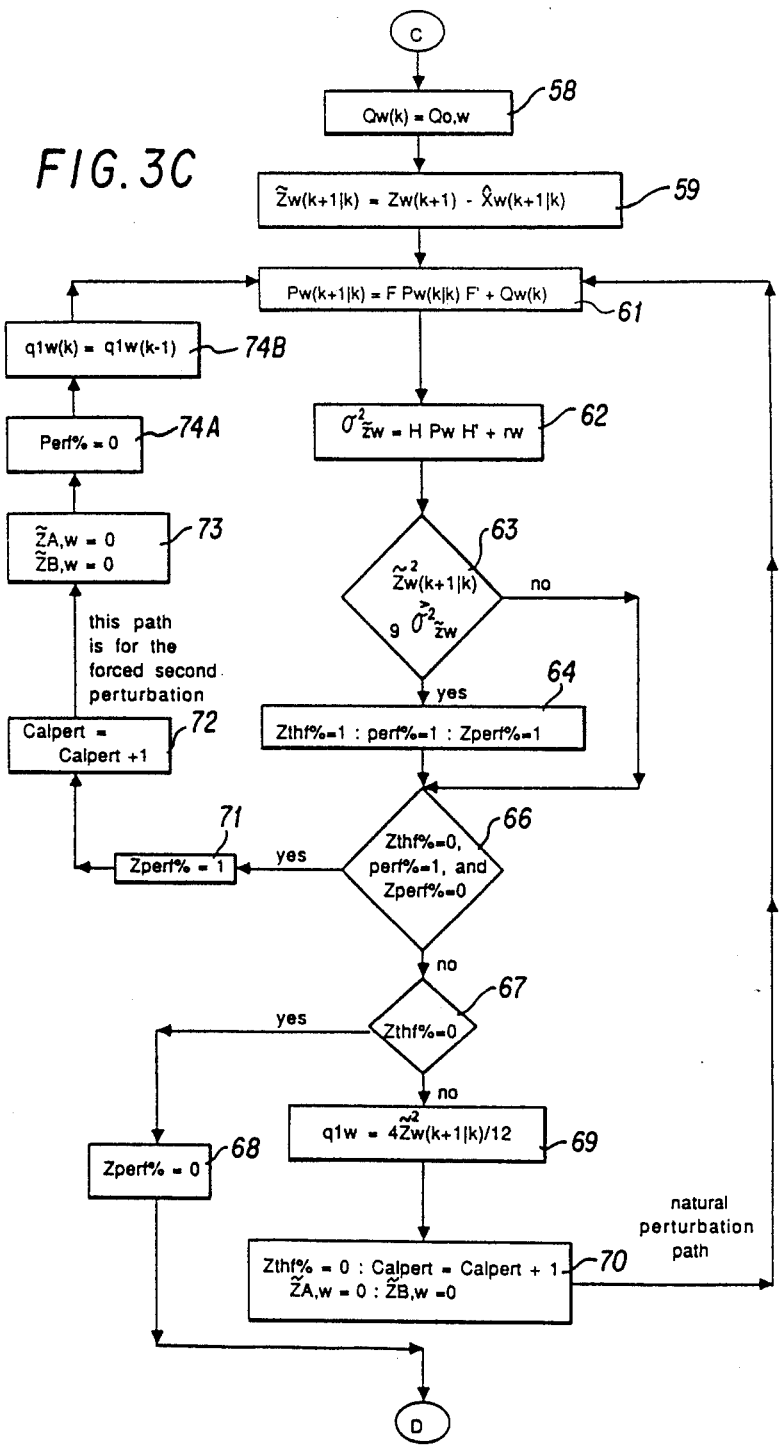

Turning now to FIG. 3C, a similar process is executed with respect to weight plant noise covariance matrix, $Q_w$, and weight error covariance matrix $P_w$. Specifically, in block 58, motor plant noise covariance matrix $Q_w(k)$ is set equal to $Q_{0,w}$ where:

$$Q_{0,w} = \begin{bmatrix} 0 & 0 \\ 0 & q_{2,w} \end{bmatrix}.$$

Then, in block 59, the weight measurement residual, $\tilde{Z}_w$, is calculated using the equation:

$$\tilde{Z}_w(k+1/k) = Z_w(k+1) - \hat{X}_w(k+1/k)$$

where:

$\tilde{Z}_w(k+1/k)$ is the weight measurement residual at time $k+1$ given measurements up to and including time k;

$Z_w(k+1)$ is the weight measurement at time $k+1$; and $\hat{X}_w(k+1/k)$ is the estimated weight at time $k+1$ given measurements up to and including time k.

Control then passes to block 61 where the weight error covariance $P_w$ is updated using the equation shown, which is similar to the equation described above with respect to block 53. Control then passes to block 62 where the weight measurement residual variance is calculated using the equation shown i.e., $\sigma\tilde{z}w^2 = H\,P_w H' + r_w$, which is similar to the equation described above with reference to block 54.

Control then passes to decision block 63 where the square of the weight measurement residual calculated in block 59 is compared with nine times the weight measurement residual variance calculated in block 62. If the square of the measurement residual is greater than nine times the measurement residual variance, control passes to block 64 where flags Zthf %, perf % and Zperf % are all set equal to one. Control then passes to decision block 66. If the comparison in decision block 63 is not satisfied, control is passed directly to decision block 66.

In decision block 66, the condition of flags Zthf %, perf % and Zperf % are checked. If all flags agree with indicated conditions as shown in block 66, control passes to decision block 67 where the condition of flag Zthf % is checked against 0, and if true, control passes to block 68 where flag Zperf % is reset to 0, and control is transferred to block 76 of FIG. 3D, entry point "D".

If flag Zthf % is determined by decision block 67 not to be set to 0, control passes to block 69 where the $q_{1,w}$ entry of the $Q_w$ matrix as set equal to four times the square of the weight measurement residual calculated in block 59 divided by 12, i.e.:

$$Q_w = \begin{bmatrix} q_{1,w} & 0 \\ 0 & q_{2,w} \end{bmatrix}.$$

Control then passes to block 70 where flag Zthf % is reset. Also in block 70 counter Calpert is incremented and quantities $\tilde{Z}_{A,w}$ and $\tilde{Z}_{B,w}$ are set equal to 0. Counter Calpert and quantities $\tilde{Z}_{A,w}$ and $\tilde{Z}_{B,w}$ are used during the tuning of the noise parameters of the system, which is described in more detail below with reference to FIG. 6.

From block 70, control returns to block 61 where weight error covariance matrix $P_w$ is again calculated using the adjusted value of $Q_w$. The weight measurement residual variance is then recalculated in block 62, which should cause decision block 63 to transfer control around block 64 directly to block 66 on this pass. In block 66, since flag Zperf % was set during the previous pass through block 64, control passes to block 67. Since flag Zthf % was reset in block 70, block 67 will transfer control to block 68 which will reset flag Zperf %, and transfer control to block 76 of FIG. 3D, entry point "D".

On the next pass through the portion of the program shown in FIG. 3C, if decision block 63 determines that the square of the weight measurement residual is less than nine times the motor measurement residual variance, decision block 66 (due to perf % =1) will transfer control to block 71, where flag Zperf % is set. Control then passes to block 72 and 73 where counter Calpert is incremented and variables $\tilde{Z}_{A,w}$ and $\tilde{Z}_{B,w}$ are set to 0. Then, in block 74, q1,w of the present time cycle, k, is set equal to $q_{1,w}$ calculated during the previous time cycle, k-1 (in block 69). In addition, flag perf % is reset to 0 in block 74.

Figure 3D:
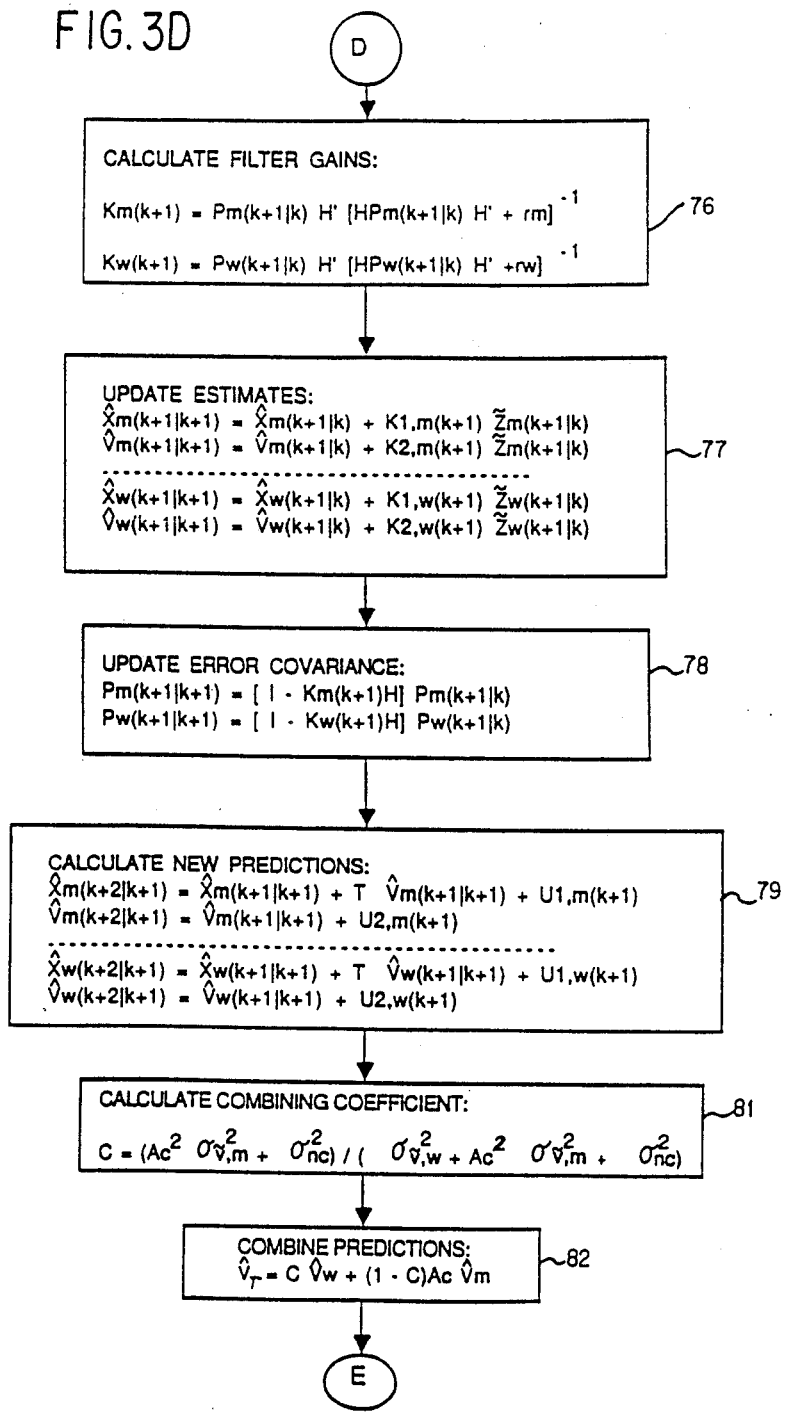

Control then passes through block 61, 62, 63, 66, 67, 68 and eventually to block 76 of FIG. 3D.

Thus, the program shown in FIG. 3C, in addition to recalculating weight plant noise covariance matrix $Q_w$ based upon the magnitude of the weight measurement residual, also forces a second artificial perturbation following every real perturbation. The forced second perturbation is represented by the loop comprising block 71-74. Forcing this second perturbation is necessary in order to allow the weigh feeding system to have an improved response to step weight measurement perturbations, like those due to refill, and the like.

Referring now to FIG. 3D, in block 76, motor Kalman gains $K_m$ and weight Kalman gains $K_w$ are calculated using the equations.

$$K_m(k+1) = P_m(k+1/k)H^T [HP_m(k+1/k)H^T + r_m]^{-1}$$

$$K_w(k+1) = P_w(k+1/k)H^T [HP_w(k+1/k)H^T + r_w]^{-1}$$

where:

$$K_m(k+1) = \begin{bmatrix} K_{1,m}(k+1) \\ K_{2,m}(k+1) \end{bmatrix}; \text{ and}$$

$$K_w(k+1) = \begin{bmatrix} K_{1,w}(k+1) \\ K_{2,w}(k+1) \end{bmatrix};$$

$K_{1,m}(k+1)$ is the motor position Kalman gain at time k+1;

$K_{2,m}(k+1)$ is the motor rate Kalman gain at time k+1;

$K_{1,w}(k+1)$ is the weight Kalman gain at time k+1;

$K_{2,w}(k+1)$ is the weight rate Kalman gain at time k+1; and all other variables have been previously defined or calculated.

The estimated motor position and motor rate and weight and weight rate are then updated using the previously calculated values for these variables, and using the Kalman gains calculated in block 76 and motor and weight measurement residuals calculated in blocks 52 and 59, respectively, using the equations shown. Control then passes to block 78 where the error covariance matrices $P_m$ and $P_w$ are updated using the equations shown, wherein I is equal to the identity matrix, and wherein all other variables have been previously defined or calculated. Control then passes to block 79 where new predictions for motor position $X_m$, motor rate $\hat{V}_m$, weight $\hat{X}_w$, and weight rate $\hat{V}_w$, are calculated using the equations:

$$\hat{X}_m(k+2/k+1) = \hat{X}_m(k+1/k+1) + T\hat{V}_m(k+1/k+1) + u_{1,m}(k+1)$$

$$\hat{V}_m(k+2/k+1) = \hat{V}_m(k+1/k+1) + u_{2,m}(k+1)$$

$$\hat{X}_w(k+2/k+1) = \hat{X}_w(k+1/k+1) T \hat{V}_w(k+1/k+1) + u_{1,w}(k+1)$$

$$\hat{V}_w(k+2/k+1) = \hat{V}_w(k+1/k+1) + u_{2,w}(k+1)$$

where:

$u_{1,m}(k+1)$ is the value of motor control applied at time k+1 which is predicted to affect the motor position at time k+2;

$u_{2,m}(k+1)$ is the value of motor control applied at time k+1 which is predicted to affect the motor rate at time k+2;

$u_{1,w}(k+1)$ is the value of motor control applied at time k+1 which is predicted to affect the weight at time k+2;

$u_{2,w}(k+1)$ is the value of motor control applied at time k+1 which is predicted to affect the weight rate at time k+2; and where all other variables have been previously defined or calculated.

Control is then transferred to block 81 where the combining coefficient, C, is calculated using the equation:

$$C = (A_c^2 \sigma_{\tilde{v},m}^2 + \sigma_{nc}^2)/(\sigma_{\tilde{v},w}^2 + A_c^2 \sigma_{\tilde{v},m}^2 + \sigma_{nc}^2)$$

where:

$A_c$ is the coefficient correlating motor rate to weight rate (correlation coefficient);

$\sigma_{\tilde{v},m}^2$ is the 22 entry of the $P_m$ matrix;

$\sigma_{\tilde{v},w}^2$ is the 22 entry of the $P_w$ matrix; and $\sigma_{nc}^2$ is the variance of the correlation noise (set during the tuning procedure of FIG. 6).

Control then passes to block 82 where the motor rate prediction and weight rate prediction calculated in block 79 are combined using correlation coefficient $A_c$ and combining coefficient C using the equation shown to arrive at a total weight rate estimate, $\hat{V}_T$.

Figure 3E:
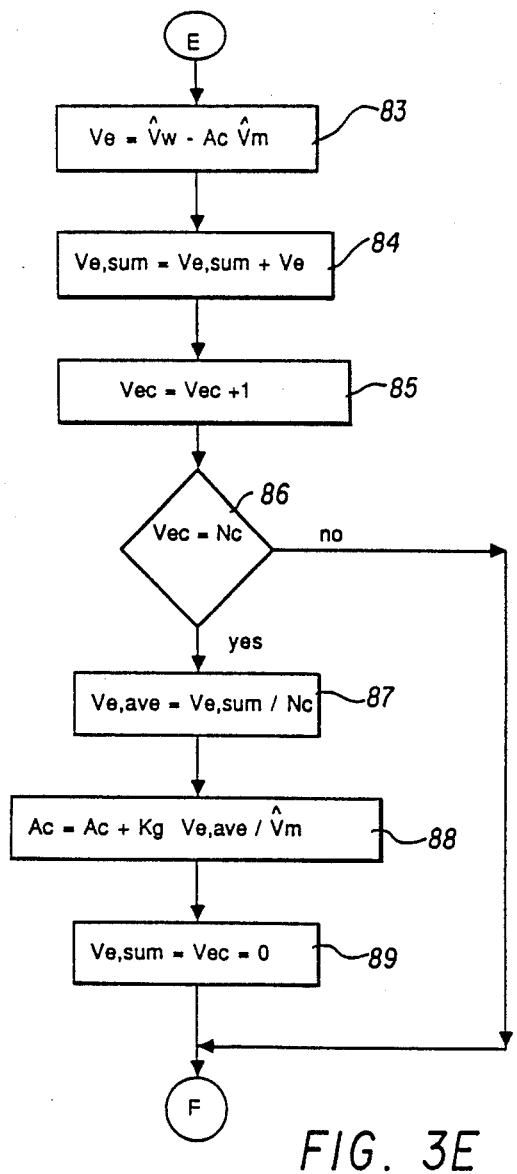

Control then passes to block 83 of FIG. 3E, entry point "E". In the process of FIG. 3E, the correlation coefficient, $A_c$, is updated every $N_c$ (for example $N_c = 10$) measurement cycles. Specifically, in block 83, weight rate error, $V_e$, is set equal to the difference between the weight rate calculated in block 79 and the motor rate, also calculated in block 79, multiplied by correlation coefficient, $A_c$. Control then passes to block 84 where the weight rate error calculated in block 83 is accumulated in variable $V_{e,sum}$.

Control then passes to block 85 where counter $V_{ec}$ is incremented and then checked in decision block 86. If $N_A$ cycles have not yet passed, control is transferred to block 90 of FIG. 3F. If, however, decision block 86 determines that $N_A$ cycles have passed (i.e., that $N_A$ calculations of $V_e$ have accumulated in $V_{e,sum}$), control passes to block 87 where Ve,e,ave calculated, the average of the $N_c$ weight rate errors. Then, in block 88, the correlation coefficient, $A_c$, is updated using the equation:

$$A_c = A_c + K_g V_{e,ave}/\hat{V}_m$$

where:

$A_c$ is the correlation coefficient;

$K_g$ is the $A_c$ update gain, for example $K_g = 0.1$;

$V_{e,ave}$ is the average of $N_A$ cycles of the difference calculated in block 83; and $\hat{V}_m$ is the motor rate calculated in block 79.

Figure 3F:
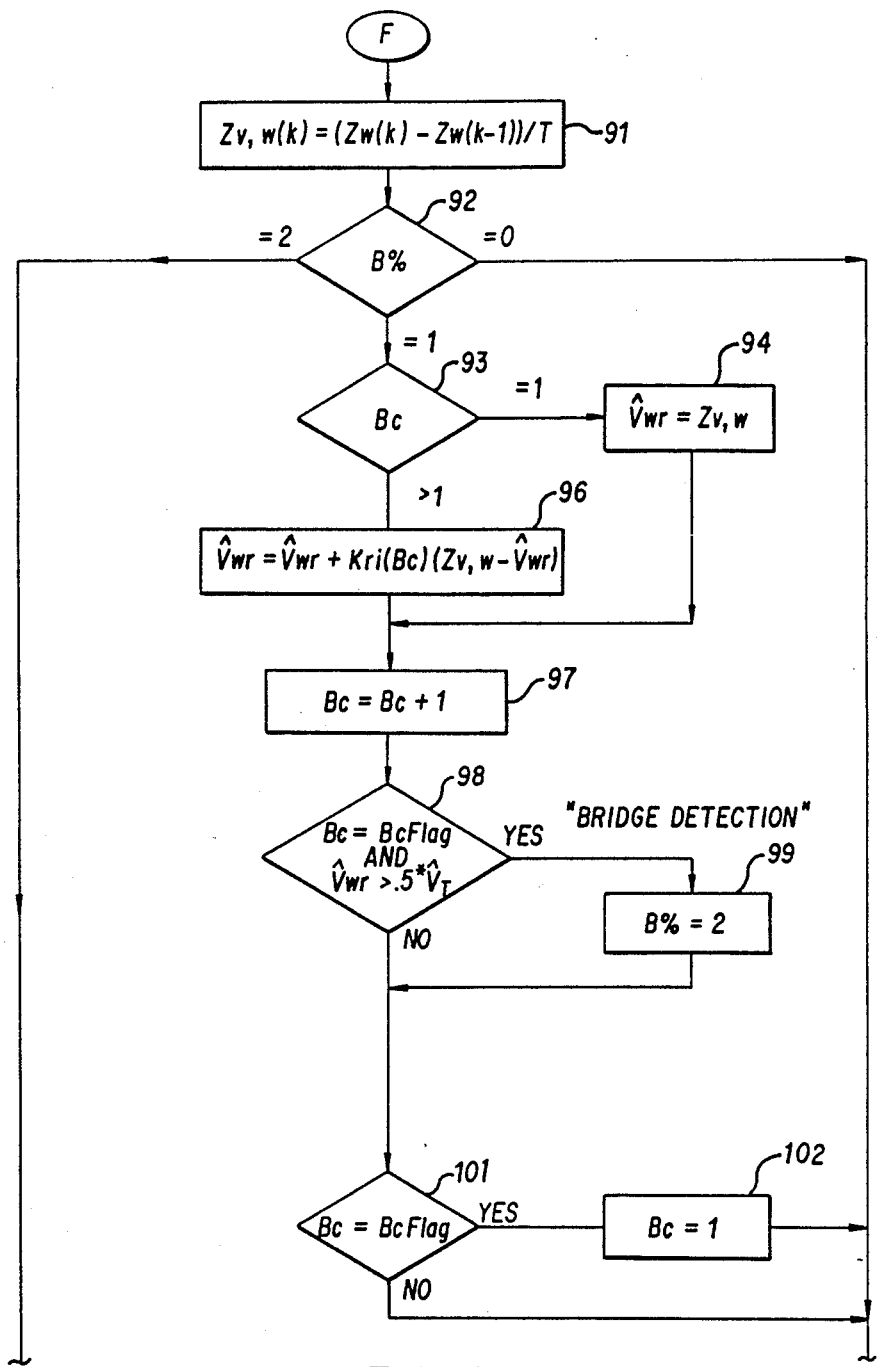
Figure 3F:
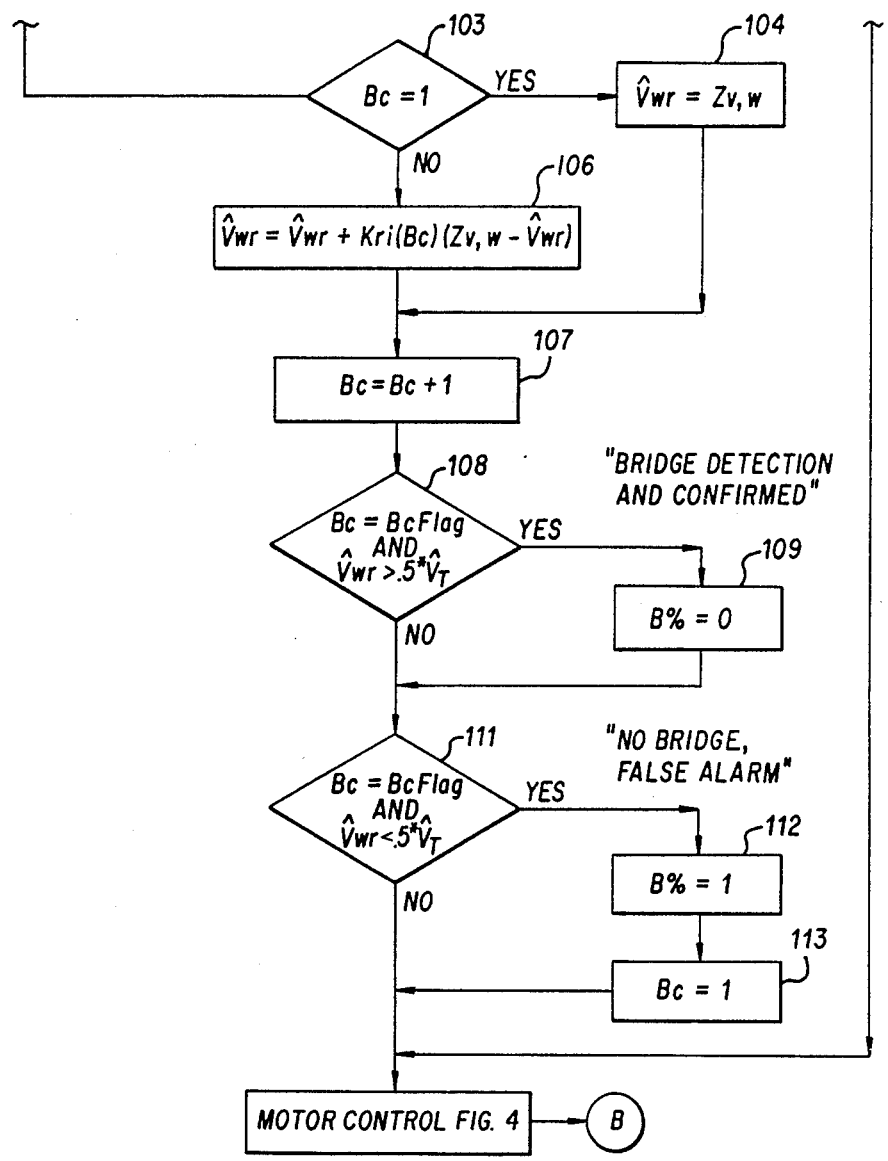

Accumulated sum, $V_{e,sum}$, and counter $V_{ec}$, are each set to 0 in block 89, and control is transferred to block 91 of FIG. 3F entry point "F".

Thus, every $N_c$ cycles, correlation coefficient, $A_c$, is recalculated based upon the difference between the estimate of the weight rate based on weight measurements $\hat{V}_w$, and the estimate of weight rate based upon motor measurements, $A_c\hat{V}_m$.

Referring now to FIG. 3F, the material bridge detecting process of the present invention is described. Beginning in block 91, velocity variable, $Z_{v,w}(k)$ is calculated as a simple time derivative using the weight measurement taken during the present cycle $Z_w(k)$, less the weight measurement taken during the past cycle, $Z_w(k-1)$, divided by sampling period T.

Control then passes to decision block 92 where the condition of tri-state flag B % is checked. If flag B % is 0, the bridge checking routine of FIG. 3F is skipped and control passes immediately to the motor control process shown in FIG. 4. This would be the case for example during start-up. If material bridge checking is to be performed, flag B % will be set equal to 1 and decision block 92 will pass control to decision block 93 where counter Bc is checked. As mentioned later, counter Bc is incremented each pass. On the first pass, counter Bc is equal to 1 and control will pass to block 94 where variable $\hat{V}_{wr}$ is set equal to $Z_{v,w}$ calculated in block 91. On the second and subsequent passes, decision block 93 will determine that counter Bc is greater than 1 and will pass control to block 96 where variable $V_{wr}$ is calculated using the equation:

$$\hat{V}_{wr} = \hat{V}_{wr} + K_{ri}(Bc)(Z_{v,w} = \hat{V}_{wr})$$

where $\hat{V}_{wr}$ is the rapid estimated weight rate;

$K_{ri}$ are the rapid identification gains calculated in FIG. 7, blocks 147-151;

Bc is the bridge counter; and $Z_{v,w}$ is measured weight velocity.

Control then passes to block 97 where bridge counter Bc is incremented. Then, in decision block 98, bridge counter Bc is compared with flag BcFlag which, in the preferred embodiment is equal to 13. In addition, decision block 98 compares the variable incrementally calculated in block 96 with, preferably, onehalf of the total weight rate estimate, $\hat{V}_T$, calculated above in block 82. If both conditions checked by decision block 98 are satisfied, this means that an initial bridge detection has occurred, and control passes to block 99 where flag B % is set equal to 2. Passage of control to block 99 indicates detection of a material bridge, however, in order to insure accurate material bridge detection, a second material bridge test is performed, and is described below.

If either condition checked by decision block 98 is not satisfied, control passes to decision block 101 where it is determined whether counter Bc is equal to BcFlag. If so, control passes to block 102 where counter Bc is reset to 1 before passing control to the process shown in FIG. 4. Otherwise, control passes directly from decision block 101 to the procedure of FIG. 4.

Figure 4:
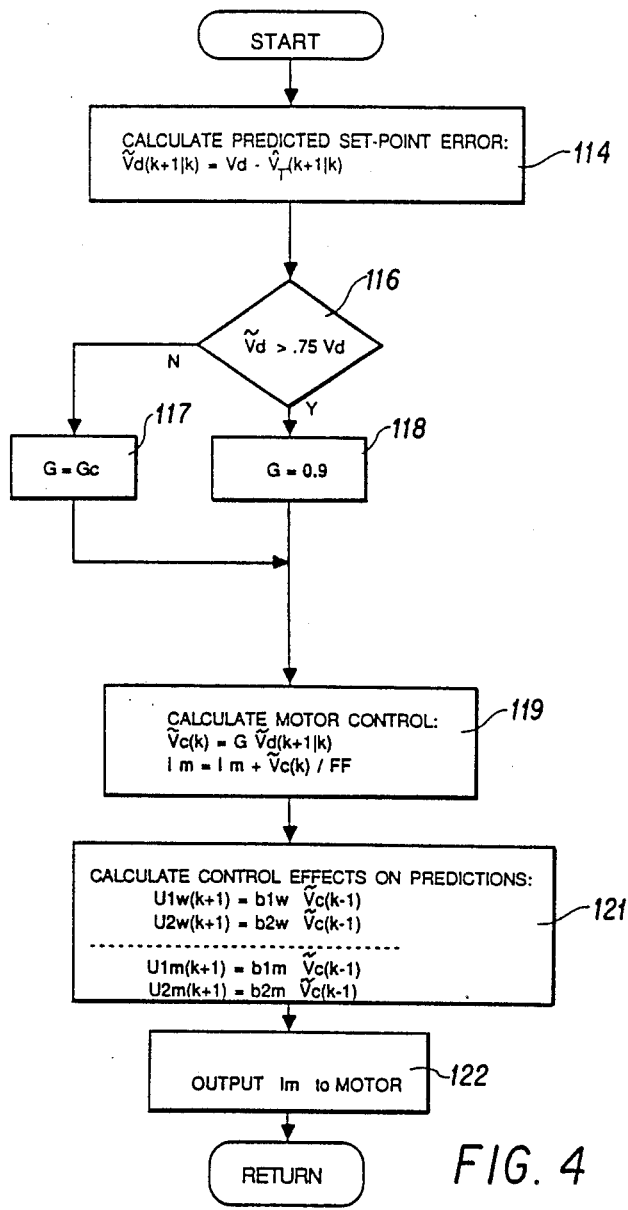
FIG. 4 is a flow chart of the computational steps performed by the motor controller of the present invention.

On a subsequent pass, if it is determined by decision block 92 that flag B % has been set to 2, control passes to decision block 103. Decision block 103 and blocks 104, 106, 107 and 108 perform functions identical to the functions of decision block 93 and blocks 94, 96, 97 and 98. Thus, together blocks 103, 104, 106, 107 and 108 constitute a second material bridge detection. If the two conditions checked by block 108 are satisfied, control passes to block 109 which indicates that the existence of a material bridge has been confirmed. In block 109, appropriate steps are taken, for example, sounding an alarm and/or stopping the weigh feeding system, and flag B % is set to 0. Control then passes to block 111. If both conditions tested by decision block 108 are not satisfied, control passes directly to decision block 111 where counter Bc is compared with limit BcFlag, and the variable $\hat{V}_{wr}$ is compared with one-half of the total weight rate estimate $\hat{V}_T$, as in block 98. If both conditions tested by decision block 112 are satisfied, control passes to block 112 and 113 where flags B % and counter Bc are both reset to 1. Otherwise, decision block 111 transfers control directly to the process of FIG. 4. Passage of control by decision block 112 to blocks 112 and 113 indicates that although a material bridge was detected (by satisfying the two conditions tested by block 98), a bridge could not be confirmed by decision block 108, and therefore no material bridge exists and no corrective measures need be taken. Turning now to FIG. 4, the motor control procedure will be described. First, in block 114, the set point error is calculated by subtracting the total estimated weight rate, $\hat{V}_T$, calculated in block 82, FIG. 3D, from the desired set point, $V_d$. Then, decision block 116 compares the set point error with, preferably, 75% of the desired set point, and appropriately transfers control to either block 117 or 118 to adjust control gain, G. $G_c$ in block 117 is less than 0.9 and is preferably 0.1, although other values are acceptable. Thus, a two-step proportional control is employed. Of course it will be understood by those of ordinary skill in the art that any number of steps could be used to accomplish this proportional control.

Control then passes to block 119 where motor control, $I_m$, is calculated integrally from the set point error, $\hat{V}_c$, control gain, G, and feed factor, FF. Control then passes to block where the control effects, used in block 79, FIG. 3B to calculate new predictions, are updated using the equation:

$$u_{1,w}(k) = b_{1,w} \overline{V}_c(k-1)$$

$$u_{2,w}(k) = b_{2,w} \overline{V}_c(k-1)$$

$$u_{1,m}(k) = b_{1,m} \overline{V}_c(k-1)$$

$$u_{2,m}(k) = b_{2,m} \overline{V}_c(k-1)$$

where $b_{1,w}$ is the position compensation factor of weight;
$b_{2,w}$ is the small signal velocity gain of weight;
$b_{1,m}$ is the position compensation factor of the motor;
$b_{2,m}$ is the small signal velocity gain of the motor; and
$\overline{V}_c(k-1)$ is the product of control gain, G, and set-point error $\overline{V}_d$, calculated in block 119 the previous cycle.

It should be noted that the position compensation factors and small signal velocity gains used in block 121 are calibrated using the procedure in FIG. 5, during system calibration. In addition, it should be noted that the quantity $\overline{V}_c(k-1)$ is used to calculate the control effects $u_1$ and $u_2$ in order to compensate for time delays in the control system of the preferred embodiment. It will be appreciated by those of ordinary skill in the art that more or less time delay can be used, without departing from the scope of the present invention.

Control then passes to block 122 where the motor signal, $I_M$, is output to control the motor. Control then passes from FIG. 4 back to block 47 of FIG. 3A where k is incremented and the entire control loop is retraced.

Turning now to the calibration routines shown in FIGS. 5, 6 and 7, and beginning with the control parameter calibration routine of FIG. 5, it has been observed that a step response of the weigh feeding system can be used to calibrate the control models of the stochastic controllers. Specifically, if a series of step functions (i.e., a square wave having a period that is long relative to the sampling interval T) is applied as a control signal by parameter calibration and control generator 24 (FIG. 1), and the uncompensated weigh feeding machine is measured, two series of measurement residuals can be calculated, one for weight measurements and one for motor measurements. From these series of measurement residuals, weight and motor compensation factors $b_{1,w}$ and $b_{1,m}$, and small signal weight and motor velocity gains $b_{2,w}$ and $b_{2,m}$ are then calculated, and are output to the appropriate Kalman filters (14 or 17, FIG. 1) for use in controlling the weigh feeding system.

Specifically, and with reference to the flow chart of FIG. 5, in block 123 a square wave signal, offset from 0 by a desired set-point, is generated as control signals $u(k)$ or equivalently, $\overline{V}_c(k)$ and is applied to the weigh feeding machine. The square wave has a peak-to-peak signal amplitude of 2A and a signal period of 20T where T is the sampling period.

The applied square wave creates a high valued motor signal of magnitude $I_{high}$ which lasts for a time 10T, followed by a low valued motor signal of magnitude $I_{low}$ which also lasts for a time 10T. The difference between $I_{high}$ and $I_{low}$ is 2A/FF, A being chosen to allow determination of system operation in the vicinity of a desired operating point (i.e., the offset of the square wave). Preferably, A is approximately 25% of the desired set-point.

During application of the square wave, control resides in block 124 where an average high mass flow estimate $\hat{V}_{w,H}$, and an average high motor rate, $\hat{V}_{m,H}$ are calculated from a series of estimates each determined just before the square wave, u(k) makes the transition from high to low, i.e. at the end of the 10T duration of the high portion of the square wave u(k) where the filter has settled. Also in block 97, an average low mass flow estimate, $\hat{V}_{w,L}$ and an average low motor rate, $V_{m,L}$ are determined from a series of estimates each determined just before the square wave, u(k), makes the transition from low to high, i.e., at the end of the 10T duration of the low portion of square wave u(k) also where the filter has settled.

Control then passes to block 126 where a sum of the measurement residuals are calculated. The residuals, $Z_w$ and $Z_m$, are generated by the difference between the actual weight measurement $\widetilde{Z}_w$ and $\widetilde{Z}_m$ and the predicted weight and motor position predicted by the filters without compensation where the measured response is first observed due to the step change of the square wave u(k). In producing the sums $\Sigma\widetilde{Z}_w$ and $\Sigma\widetilde{Z}_m$, residuals calculated for each high portion of the square wave are multiplied by 1, and residuals calculated for each low portion of the square wave are multiplied by −1.

Control then passes to block 128 where the small signal gains $b_{2,w}$ and $b_{2,m}$ are calculated using the equation:

$$b_{2,w} = (\hat{V}_{w,H} - \hat{V}_{w,L})/2A$$

$$b_{2,m} = (\hat{V}_{m,H} - \hat{V}_{m,L})/2A$$

In other words, the respective small signal gains are equal to the difference between the high and low estimates, divided by the peak-to-peak input magnitude 2A.

Then, in block 129, weight composition factors, $b_{1,w}$ and $b_{1,m}$ are calculated using the equation:

$$b_{1,w} = \Sigma\widetilde{Z}_w/2NA$$

$$b_{1,m} = \Sigma\widetilde{Z}_m/2NA$$

where $\Sigma\widetilde{Z}_w$ is the sum of the weight measurement residuals calculated in block 127;
$\Sigma\widetilde{Z}_m$ is the sum of the motor measurement residuals calculated in block 127; and
N and A are the number of cycles and amplitude, respectively, of the applied square wave.

In other words, the weight compensation factors are the average of the respective measurement residuals normalized by magnitude A.

Then, in block 131, weight compensation factors $b_{1,w}$ and $b_{1,n}$, and small signal gains, $b_{2,w}$ and $b_{2,m}$ are sent to the Kalman filters (and are used specifically in block 121 of FIG. 4).

Turning now to the tuning of noise parameters $r_m$, $r_w$ and $q_m$ and $q_w$, and variance of the correlation noise $\sigma_{nc}^2$. Use is made of the known linear relationship existing between the plant and measurement noise variances to the predicted measurement residual variances in order to calculate estimates of the actual plant and measurement noise variances. Specifically, the weigh feeding system is controlled by parameter calibration and control generator 24 to run the weigh feeding machine at a constant speed (i.e., each value of control vector u(k) is the same, and two corresponding series of measurements $Z_w(k)$ and $Z_m(k)$ are taken and are respectively fed to two pairs of constant gain filters, $A_w$ and $B_w$, and $A_m$ and $B_m$, each with a different set of fixed known gains. In the preferred embodiment, filter $A_m$ has gains $K1_{A,m}=0.8$ and $K2_{A,m}=0.4$; filter $B_m$ has gains $K1_{B,m}=0.4$, and $K2_{B,m}=0.2$; filter $A_w$ has gains $K1_{A,w}=0.8$ and $K2_{A,w}=0.4$; and filter $B_w$ has gains $K1_{B,w}=0.4$ and $K2_{B,w}=0.2$. From each of the filters, corresponding measurement residual variances are calculated and from these, estimates for the measurement noise variances $r_m$ and $r_w$ and plant noise variances $q_m$ and $q_w$ are calculated.

In addition, the two Kalman filters of the regular control loop are also run during this constant speed open-loop calibration interval, and a series of mass flow estimates and motor rate estimates are generated. From this series of mass flow estimates and motor rate estimates, a series of residuals are calculated form a difference between the estimated mass flow rate based upon weight measurements, and the estimated mass flow rate based on the product of the motor rate estimates multiplied by a nominal correlation factor $A_{c,nom}$. From this series of residuals, a correlation noise variance, $\pi_{nc}^2$, is calculated. This correlation noise variance is used in the cyclic calculation of correlation factor, C (see block 81, FIG. 3D).

Referring to the flow chart of FIG. 6, the noise calibration algorithm of the present invention is shown. To initiate the algorithm, the weigh feeding system is run with a constant speed beginning in block 132. Decision block 133 determines if two consecutive perturbation free measurements have been taken. If so, filter initiation (similar to the filter initiation shown above in FIG. 3A and supporting text) is done for all four filters $A_w$, $B_w$, $A_m$ and $B_m$ in step 134. Next, preferably 35 measurement cycles are allowed to lap by use of looped decision block 136 in order to allow the outputs of filters $A_w$, $B_w$, $A_m$ and $B_m$ to settle. Then preferably 100 measurement cycles are performed and the residuals $\widetilde{Z}_{A,m}$; $\widetilde{Z}_{B,m}$; $\widetilde{Z}_{A,w}$; $\widetilde{Z}_{B,w}$; and $\widetilde{V}_{w/m}$ are calculated in blocks 137 and 138. Then in block 139, the sum of the residuals $\Sigma \widetilde{Z}_{A,m}$; $\Sigma \widetilde{Z}_{B,m}$ etc., as well as the sum of the square of the residuals, $\Sigma \widetilde{Z}_{A,m}^2$; $\Sigma \widetilde{Z}_{B,m}^2$; $\Sigma \widetilde{Z}_{A,w}^2$; $\Sigma \widetilde{Z}_{B,w}^2$; and $\Sigma \widetilde{V}_{w/m}^2$ are are calculated in block 139. Decision block 141 allows 100 measurement cycles.

As mentioned above, the regular Kalman filters are also operated for these 100 measurement cycles. This allows data editing for the weight measurements. Specifically, and referring once again to FIG. 3C, if a weight measurement perturbation is detected, counter Calpert is incremented and residuals $\widetilde{Z}_{A,w}$ and $\widetilde{Z}_{B,w}$ are each set to 0 in block 70 and also in blocks 72 and 73. By this process, weight measurement perturbations can be ignored during the tuning procedure.

After the condition tested by decision block 141 in FIG. 6 is satisfied, control passes to block 142 where quantity Nc is set equal to 100 less counter Calpert. Control then passes to block 143 where the measurement residual variances for each of the four filters $A_m$, $B_m$, $A_w$ and $B_w$ are calculated using the equations shown, as is the noise correlation variance, $\sigma_{nc}^2$. Control then passes to block 144 where measurement noise variance $r_m$ and plant noise variance $q_m$ are calculated from the variances produced by filters $A_m$ and $B_m$, and measurement noise variance $r_w$ and plant noise variance $q_w$ are calculated from the variances produced by filters $A_w$ and $B_w$, as presented in detail in U.S. Ser. No. 344,458, filed Apr. 28, 1989. In block 146, the measurement noise variances, plant noise variances and correlation noise variance are sent to the appropriate Kalman filters of the stochastic controller.

The present invention has provisions to noise calibrate in the mass mode. To calibrate in the mass mode, the weight compensation factors $b_{1,w}$ and $b_{1,m}$ and small signal gains, $b_{2,w}$ and $b_{2,m}$, calculated in FIG. 5, are first calibrated and are included in the four filters $A_m$, $B_m$, $A_w$ and $B_w$. The control u(k) is then allowed to vary as in the previously described set-point control manner. The noise calibration procedure of FIG. 6 then follows. Noise calibration in the mass mode aids in enhancing the versatility of this invention and allows for noise calibration or recalibration during mass mode control.

Turning now to the flow chart of FIG. 7, tuning of correlation factor, $A_c$, is described. As mentioned above with reference to FIG. 6, the Kalman filters used for control are allowed to run for 100 cycles which requires 100 weight and 100 motor measurements to be taken. These two series of 100 measurements are used in the rapid identification process of FIG. 7.

Specifically, in the first loop comprising blocks 147–151, a vector of length 100 is obtained for rapid identification gain, $K_{ri}$. In block 147, seeds for the rapid identification equation used in block 150 are entered and, with the aid of blocks 149 and 151, the equations of block 150 are cyclically performed to generate the 100 element rapid identification gain vector, $K_{ri}$.

Of course, since the individual entrys in the rapid identification vector, $K_{ri}$, are determined once the seeds entered into block 147 are determined, the rapid identification gain calculation routine executed by blocks 147–151 will always result in the same sequence for rapid identification gain vector $K_{ri}$. Thus, rather than recalculating vector, $K_{ri}$, each time correlation factor, $A_c$, is calculated, the rapid identification vector, $K_{ri}$, could be prestored.

After calculation of rapid identification vector, $K_{ri}$, counter I is reset in block 152 and the loop comprising blocks 153–158 is cyclically traversed using the two series of 100 measurements, $Z_w$ and $Z_m$, produced by the Kalman filters.

More particularly, in block 153, simple estimates for weight rate $Z_{v,w}$, and motor rate $Z_{v,m}$, are determined by taking the simple time derivative of adjacent measurements. Then, in block 156, quantities $\hat{V}_w$ and $\hat{V}_m$ are accumulated using the equation shown, including rapid identification gains, $K_{ri}$. After 100 cycles through block 156, decision block 157 transfers control to block 159 where correlation factor $A_c$ is calculated as $V_w$ divided by $V_m$, each determined after 100 cycles through block 156.

The following is a commented source code listing of a source code program for computer 15 of the preferred embodiment including self-tuning calibration and weight and motor measurements. As presented in detail in Table II, this program incorporates the steps shown in the flow charts of FIGS. 3A–3F and 4–7.

TABLE II

| FIGURE | Program Statements |
| --- | --- |
| FIG. 3A | 3700–6900, 9600 |
|  | 31300–31800 |
| FIG. 3B | 25400, 25950 |
|  | 26450–26900 |
| FIG. 3C | 25300 |
|  | 25960–27050 |
| FIG. 3D | 24300–25360 |
|  | 25400–26250 |
|  | 27000–28120 |
| FIG. 3E | 27800–28126 |
| FIG. 3F | 25350–25399 |
| FIG. 4 | 24600–25280 |

TABLE II-continued

| FIGURE | Program Statements |
|---|---|
| FIG. 5 | 28200–28400 |
|  | 28600–29700 |
|  | 30470–31200 |
| FIG. 6 | 25100–25280 |
|  | 25700–27875 |
|  | 27200–27350, 23760 |
|  | 32200–33000 |
|  | 34400–37200 |
| FIG. 7 | 915–970 |
|  | 25350–25360 |
|  | 35100–35120 |
|  | 36140–36430 |

While the invention has been described by reference to a specific illustrative embodiment thereof, many changes and modifications of the invention may become apparent to those skilled in the art without departing from the spirit and scope of the invention. For example, rather than using two Kalman filters for conditioning the weight measurements and motor measurements, a single Kalman filter could be employed. The main idea behind the use of one filter is based on the physical relationship between the weight rate, $V_w$ and the motor rate, $V_m$:

$$V_w = A_c V_m + n_c$$

where $A_c$ is the coupling coefficient and $n_c$ is the associated noise process.

Figure 8:
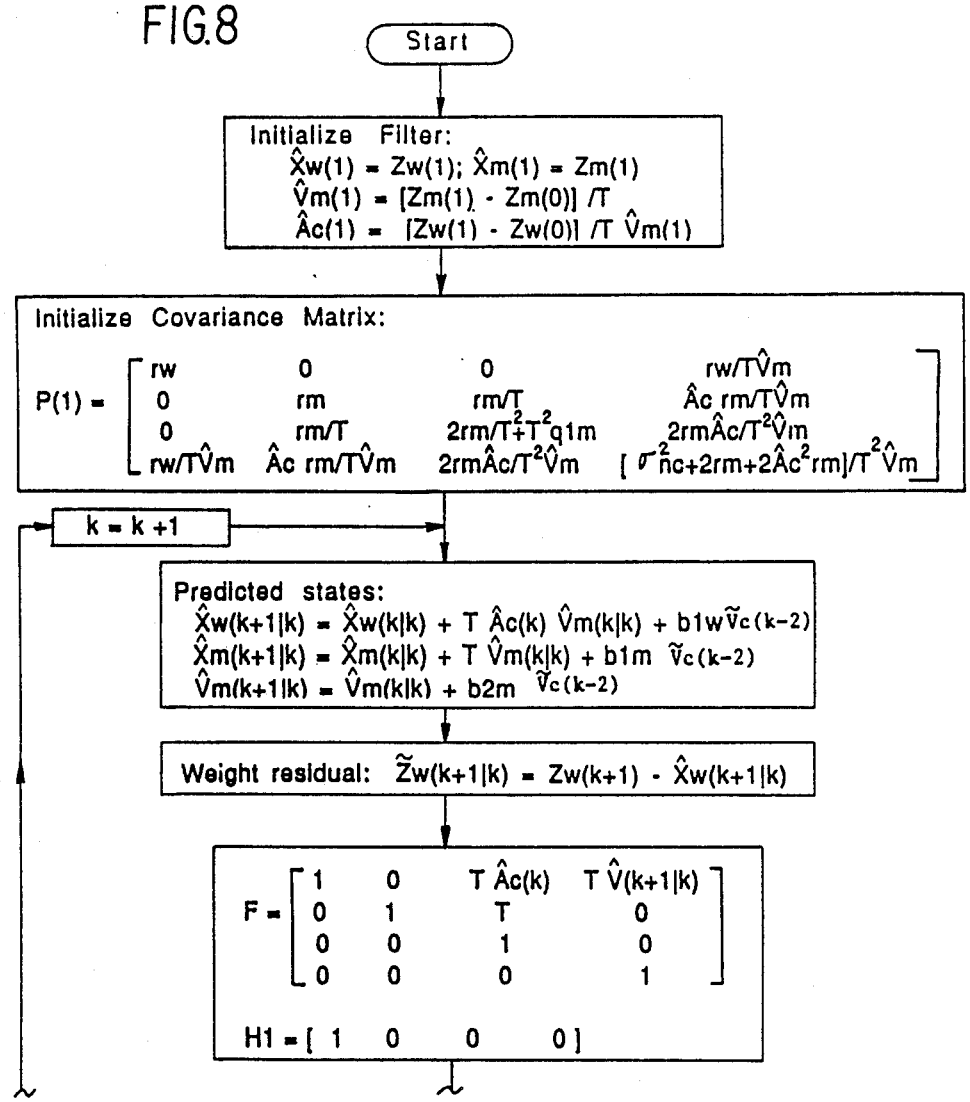
FIG. 8 is a flow chart showing a second method according to the invention of integrating the sensed motor position into the estimation process.
Figure 8:
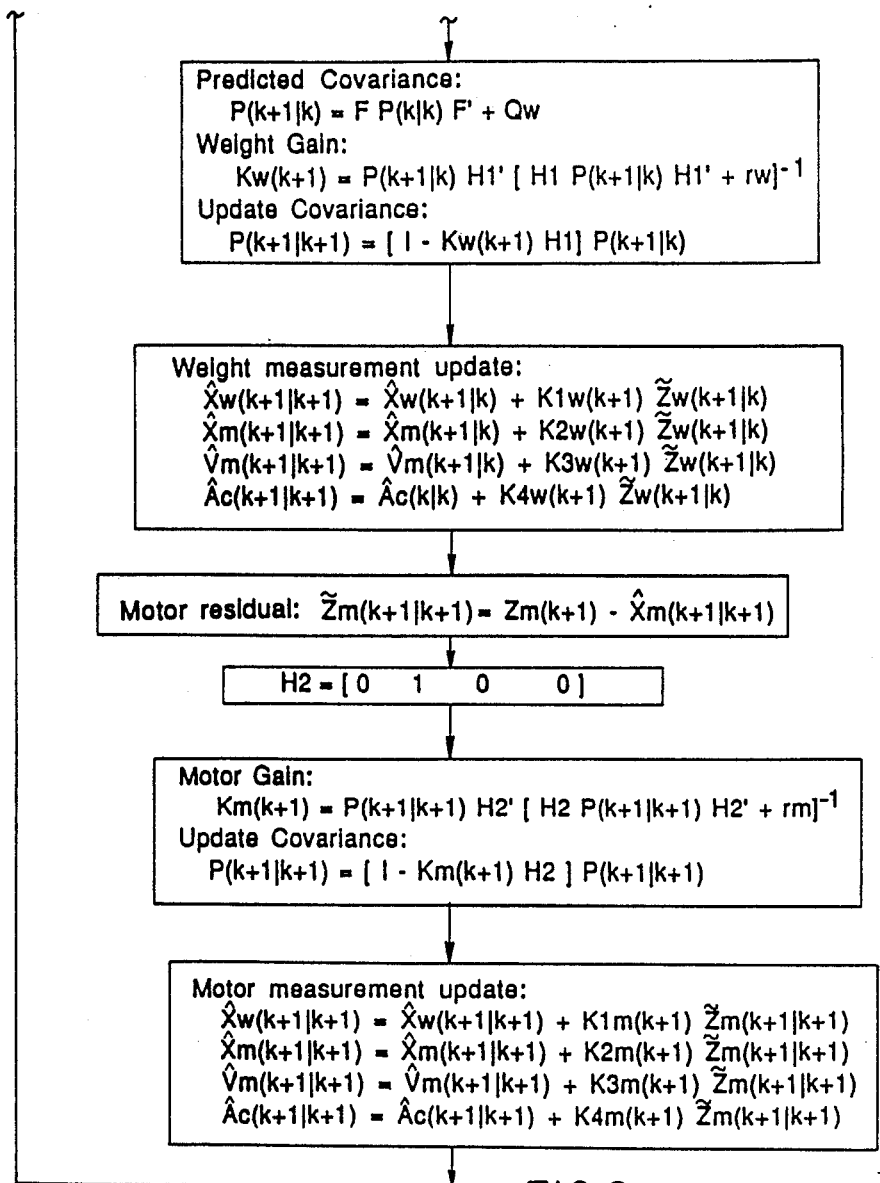

In the combined formulation, the systems's dynamics can be expressed by the equations:

$$X_w(k+1) = X_w(k) + T A_c V_m(k) + w_1(k)$$

$$X_m(k+1) = X_m(k) + T V_m(k) + w_2(k)$$

$$V_m(k+1) = V_m(k) + w_3(k)$$

where $w_1$, $w_2$, and $w_3$ are the state noise. It is noted that the weight rate is not explicitly given, but is implicitly given by the physical relationship to the product $A_c V_m$ as given above. It will be appreciated by those skilled in the art that an extended Kalman Filter would be constructed to estimate the states $X_w$, $X_m$, $V_m$ and the parameter $A_c$. FIG. 8 contains the sequence of steps necessary to process the weight and motor measurements, $Z_w$ and $Z_m$ in an efficient manner.

The compensation and tuning parameters can be obtained either by the method described hereinabove or by corresponding techniques well known to those skilled in the art. Noise and abnormal influences which cause the weight and/or motor measurements to vary can be processed with the techniques described hereinabove. For motor control, the implicit weight rate estimate $\hat{V}_w = A_c \hat{V}_m$ is used in the integral control process the same way as $\hat{V}_T$ has been shown hereinabove.

I claim:

COPYRIGHT 1988, K-TRON INTERNATIONAL INC.

```
400 DIM ZRESA(300), ZRESB(300), SIGN2(300), SIGW2(300), TDAVG(300)
405 DIM ZMPRESA(300), ZMPRESB(300), MPSIGN2(300), MPSIGW2(300),
        MPTDAVG(300)
410 DIM ZAAVE(300), ZBAVE(300)
415 DIM MPZAAVE(300), MPZBAVE(300)
416 DIM VWMPEAVE(300)
417 DIM VWMPERROR(300), VWMPEVAR(300)
500 DIM MPCTRL$(2), CALFLG$(2)
501 REM
502 REM L = CONVERSION WINDOW LENGTH
503 REM I = MOTOR DRIVE COMMAND AS I= HZ.
504 REM WT = WEIGHT COUNT ; WERR = WEIGHT ERROR INDICATOR
505 REM TS = TIME STAMP ; DTS = MEASURED SAMPLE TIME
506 REM MP = MOTOR POSITION
507 REM FR = FULL SCALE FEEDRATE
508 REM SP = SET POINT
509 REM FSC = FULL SCALE CAPACITY
510 REM ---------------------------------------------------------------
520 REM ------------------- INITIALISATION ---------------------------
530 REM
600 FOR I = 0 TO 300
700 ZRESA(I) = 0: ZRESB(I) = 0: SIGN2(I) = 0: SIGW2(I) = 0: TDAVG(I) = 0
800 NEXT
810 MPCTRL$(0) = "OFF": MPCTRL$(1) = "ON "
820 CALFLG$(0) = "non-CAL   ": CALFLG$(1) = "CALIBRATION"
900 CALFLAG% = 0
905 REM calacation of the gains and normalized performances for rapid identification of
        weight/motor rate
910 DIM KRI(100), ARI(100), VWRI(100), VMPRI(100)
912 GOTO 920
```

```
915 LPRINT "gains & performance for rapid identification "
916 LPRINT "initial gain = 1   .  initial performance factor = 2"
917 LPRINT "cycle    SA-gain     RI-gain    RI-performance factor"
920 KRI(1) = 1: ARI(1) = 2
930 FOR I = 2 TO 100
940 KRI(I) = (ARI(I - 1) + KRI(I - 1)) / (ARI(I - 1) + 2 + 2 * KRI(I - 1))
950 ARI(I) = (1 - KRI(I)) ^ 2 * ARI(I - 1) + 2 * KRI(I) ^ 2 - 2*(1 - KRI(I))*KRI(I)*KRI(I - 1)
953 GOTO 970
955 LPRINT I, USING "###.##### "; 1 / I, KRI(I), ARI(I)
960 PRINT I, USING "###.##### "; 1 / I, KRI(I), ARI(I)
970 NEXT I
1000 SSWCOMPF = 0: SSVCGAIN = 0
1050 MPSSWCOMPF = 0: MPSSVCGAIN = 0
1100 IADD = 50
1200 CORR = -1: SUM2 = 0: VSUMLOW = 0: VSUMHIGH = 0: IIFLAG% = 0: IILOWCOUNT
     = 0: IIHIGHCOUNT = 0
1250 VWMESUM = 0: VWMECOUNT = 0
1300 FAC = -1: MPFAC = 1: ACORR = -.0103: calstop% = 500: BRIDGE% = 0:
     BCOUNTFLAG = 13
1400 AN = 2.5: AW = 1.875: BN = 1.666667: BW = 6.666667: DELTA = 13.54167
1410 REM OPEN COMMUNICATIONS WITH THE OUTSIDE WORLD
1420 REM OPEN COMMUNICATIONS FILE#1 (128 BYTES) FOR ACA-1 AT 9600 BAUD,
1430 REM ODD PARITY, 8 DATA BITS, ONE STOP BIT, NO `CLEAR TO SEND',
1440 REM NO `DATA SET READY', PARITY CHECKING DISABLED.
1450 OPEN "com1: 9600,N,8,1,CS,DS" FOR RANDOM AS #1
1510 REM --------------------------------------------------------------
1520 REM ----------------- START MAIN PROGRAM ----------------------------
1530 REM
1600 CLS : PRINT "KALMAN FILTER ALGORITHM"
3200 GOSUB 19000    'ENTRANCE POINT FOR INITIALIZATION ONLY.  LOOP USES 2800
3300 GOSUB 20200    'INITIALIZE ANALYZER
3400 GOSUB 18500    'WRITES A RESET TO THE I/O BOARD VIA THE PORT
3500 GOSUB 17400    'BUILDS A SETF$
3600 GOSUB 32500    ' initialize double filters
3700 CGAIN = 15: CTIME% = 15: NSIG = 50: VDSIG = 25: T = 1: VDESIRE = -5
3800 FILENME$ = "TEMP": FF = .3: CFLAG = 0'FF=FEED FACTOR (VELOCITY/M.SPEED
     COMMAND) AND T=APPROX SAMPLE TIME
3900 REM FF=.15*FF
4000 FSC = 60        'FULL SCALE CAPACITY IN KG
4100 REM PRINT " "
4200 INPUT " CGAIN... THE DEFAULT VALUE IS 15"; I
4250 IF I <> 0 THEN CGAIN = I
4300 REM IF I = 0 THEN 4300
4400 REM IF (I > 0) AND (I < 1!) THEN 4100
4500 REM PRINT "UNACCEPTABLE ENTRY FOR CGAIN. USE VALUE BETWEEN 0 AND
         1":BEEP
4600 REM GOTO 3500
4700 REM CGAIN=.2 'NOT USED IN VOLUMETRIC
4800 PRINT : PRINT " THE KALMAN FILTER IS ACTIVATED AFTER 5 SAMPLES"
4900 REM PRINT" LOOP COUNT WHERE MOTOR CONTROL STARTS, I=20":I=20
5000 ' INPUT "ENTER CONTROL TIME DELAY(TDELAY) ";TDELAY
5100 ' INPUT "ENTER MOTOR ACTIVATION DELAY (TAU) ";TAU
5200 ' IF I<>0 THEN CTIME%=I
5300 PRINT " ": INPUT "INPUT WEIGHT NOISE S.D., DEFALULT = 50"; I
5400 IF I <> 0 THEN NSIG = I
5500 PRINT " ": INPUT "INPUT VELOCITY DESIRED S.D., DEFAULT = 25"; I
5600 IF I <> 0 THEN VDSIG = I
5700 PRINT
5750 ITEMP = 200
5800 I = 0!: INPUT "ENTER MOTOR SPEED (DMT WC/SEC) run in volumetric, DEFAULT =
     200 "; I
```

```
5850 IF I <> 0 THEN ITEMP = I
5900 REM LPRINT "MOTOR SPEED (DMT WC/SEC) run in volumetric ";ITEMP:LPRINT
6000 IF ITEMP <> 0 THEN I = ABS(ITEMP)
6100 STARTI% = -INT(I)
6200 I = -ABS(I / FF)'MAKE SURE IT IS NEG.
6300 PRINT : INPUT "ENTER THE OUTPUT DATA FILE NAME, DEFAULT = 'TEMP'"; a$
6400 IF a$ <> "" THEN FILENME$ = a$
6500 CLS
6600 PRINT "*********************** RUN
      PARAMETERS*****************************"
6700    REM PRINT
6800 PRINT " CGAIN", " NSIG"," VDSIG", " CTIME", " STARTI    FILENAME :"
6900 PRINT CGAIN, NSIG, VDSIG, CTIME%, STARTI%; TAB(69); FILENME$
7300 LOCATE 5, 1
7400 PRINT "********************** SYSTEM
      STATUS*****************************************"
7500 REM PRINT:
7600 PRINT " COUNT", "SETPOINT", "T.STAMP", "DMT W.CNTS", "M-signal"; TAB(69);
     "VMP-CONTROL": REM change M.SPEED to M-signal
7700 LOCATE 10, 1
7800 PRINT "********************* FILTER
      CHARACTERISTICS*********************************"
7900    REM PRINT:
8000 PRINT "X_HAT   ", "V_HAT   ", "GAIN K1    GAIN K2    DELTA T"
8100 LOCATE 11, 63: PRINT "Z_RES"
8110 LOCATE 14, 1: PRINT "MP_HAT  ", "V_MP_HAT", "MP-GAIN K1  MP-GAIN K2
     DELTA T"
8120 LOCATE 14, 63: PRINT "MP_RES"
8200 LOCATE 19, 1
8300  PRINT "** OPTIONS **   ENTER 'S' TO CHANGE SETPOINT "
8310  PRINT "** OPTIONS **   ENTER 'H' TO HALT"
8320  PRINT "** OPTIONS **   ENTER 'M' TO SWITCH ON/OFF VMP-CONTROL"
8400 GOSUB 22600
8500 OPEN "c:" + FILENME$ FOR RANDOM AS #2 LEN = 135: lengthdata = 135
8600 FIELD #2, 10 AS ft$, 7 AS fx$, 9 AS fxh$, 7 AS fv$, 5 AS fk1$, 5 AS fk2$, 5 AS fi$, 7
     AS fms$, 7 AS fzres$, 9 AS fmph$, 7 AS fvmph$, 7 AS fmpres$, 5 AS fkmp1$, 5 AS
     FKMP2$, 7 AS FAC$, 7 AS Fat$, 7 AS Fvw$, 7 AS Fvmp$, 7 AS FVt$
8700 GOSUB 16200    'SENDS A WINDOW LENGTH COMMAND
8800 GOSUB 17400
8900 GOSUB 16600 'SEND "START READ WEIGHT" COMMAND
9000 '---------------BEGINNING OF LOOP---------------------------------
9100 REM FOR LUP% = 1 TO 1070
9150 FOR LUP% = 1 TO 3500
9200 REM IF abort=1 THEN 10800
9300 a$ = INKEY$: IF a$ = "" THEN 10100
9400 IF (a$ = "S") OR (a$ = "s") THEN 9800
9500 IF (a$ = "H") OR (a$ = "h") THEN 12600
9600 IF (a$ = "C") OR (a$ = "c") THEN CALFLAG% = 1: CALPERT = 0: ZPERF% = 1
9650 IF ((a$ = "M") OR (a$ = "m")) AND MPCTRL% = 1 THEN MPCTRL% = 0: GOTO 9700
9660 IF ((a$ = "M") OR (a$ = "m")) AND MPCTRL% = 0 THEN MPCTRL% = 1
9670 IF ((a$ = "B") OR (a$ = "b")) AND BRIDGE% = 0 THEN BCOUNT = 1: BRIDGE% = 1
9700 GOTO 10100
9800 SCONT% = 1: TDADD = TIMER: LOCATE 22, 1
9900 INPUT "ENTER NEW SETPOINT. THE UNITS ARE (DMT WEIGHT COUNTS)/SEC";
     SP
10000 VDESIRE = -ABS(SP)'I=VELOCITY OR FLOW RATE
10100 T0 = TIMER: REM TDADD=TIMER-TDADD : T0 = TIMER
10200 PRINT #1, RED$ 'SEND A "READ AND START WEIGHT" COMMAND
10300 GOSUB 13100        'DO MATH
10400 GOSUB 14100
10500 GOSUB 20400
```

```
10600 Z = WT: IF LUP% = CTIME% THEN CFLAG = 1
10700 IF LUP% = 4 THEN ZPAST = WT
10800 IF LUP% = 5 THEN GOSUB 31400'INITIAL FILTER (N=0)
10900 IF LUP% > 5 THEN GOSUB 24300'KALMAN FILTER
11000 REM IF (LUP% >= 25) AND (DINIT <2 ) THEN GOSUB 24700 'init double filters
11100 IF (CALFLAG% = 1) AND (DINIT < 2) THEN GOSUB 31900'init double filters
11200 REM iF I = SAVEDI THEN 10200    'I IS MOTOR DRIVE COMMAND FREQUENCY
11300 SAVEDI = I: GOSUB 17400'REBUILD A NEW MOTOR SPEED COMMAND AND
      SEND IT
11400 'DELAY 1/2 SECOND INCLUDING PROGRAM EXECUTION TIME
11500 REM T0=.022*L+.043 + T0 : REM T0=.022*L+.043 + T0
11600 REM LSET FT$=STR$(TS):LSET FX$=STR$(WT):LSET
      FXH$=STR$(INT(XHAT)):LSET FV$=STR$(INT(VHAT))
11700 LSET ft$ = STR$(TS): LSET fx$ = STR$(WT): LSET fxh$ = STR$(XHAT): LSET fv$ =
      STR$(VHAT)
11800 LSET fk1$ = STR$(INT(K1 * 1000)): LSET fk2$ = STR$(INT(K2 * 1000!))
11850 LSET fkmp1$ = STR$(INT(KMP1 * 1000)): LSET FKMP2$ = STR$(INT(KMP2 *
      1000!))
11900 LSET fi$ = STR$(INT(I)): LSET fms$ = STR$(MP): LSET fzres$ = STR$(ZRES)
12000 LSET fmph$ = STR$(MPHAT): LSET fvmph$ = STR$(VMPHAT): LSET fmpres$ =
      STR$(MPRES)
12050 LSET FAC$ = STR$(ACORR): LSET Fat$ = STR$(AT): LSET Fvw$ = STR$(VHATW):
      LSET Fvmp$ = STR$(VHATMP): LSET FVt$ = STR$(VHATTOTAL)
12100 REM LPRINT FMPH$,FVMPH$,FMPRES$
12200 PUT #2, LUP% + 1
12300 IF TIMER <= T0 THEN 12300
12400 REM FOR BI=1 TO 1800: NEXT
12500 NEXT
12600 LSET ft$ = STR$(LUP% - 1)
12610 LSET fx$ = STR$(lengthdata): LSET fxh$ = STR$(ACORR * 1000)
12615 LSET fv$ = STR$(NSIG2): LSET fk1$ = STR$(VSIG2)
12620 LSET fk2$ = STR$(MPNSIG2): LSET fi$ = STR$(MPVSIG2)
12625 LSET fms$ = STR$(SSWCOMPF * 1000)
12630 LSET fzres$ = STR$(SSVCGAIN * 1000): LSET fmph$ = STR$(MPSSWCOMPF)
12640 LSET fvmph$ = STR$(MPSSVCGAIN): LSET fmpres$ = STR$(SIGNC2)
12645 LSET fkmp1$ = STR$(AT * 1000)
12700 PUT #2, 1: CLOSE #2
12800 I = 0: GOSUB 17400: GOSUB 37400
12900 '--------------END OF LOOP-------------------------------------
13000 ' DELAY FOR ABOUT 0.1 SEC
13100 TX = TIMER + .12
13200 IF TIMER < TX THEN 13200
13300 REM FOR BI=1 TO 800 : NEXT
13400 RX$ = ""
13500 WHILE NOT EOF(1)
13600 I$ = INPUT$(LOC(1), #1)
13700 WEND
13800 RX$ = I$
13900 RETURN
14000 '***************************************************************
14100 W$ = MID$(RX$, 32, 2) + MID$(RX$, 37, 2) + MID$(RX$, 42, 2)
14200 WT = VAL("&H" + MID$(W$, 6, 1)) + VAL("&H" + MID$(W$, 5, 1)) * 16 +
      VAL("&H" + MID$(W$, 4, 1)) * 256 + VAL("&H" + MID$(W$, 3, 1)) * 4096! +
      VAL("&H" + MID$(W$, 2, 1)) * 65536!
14300 WT = VAL("&H" + MID$(W$, 1, 1)) * 65536! * 16! + WT
14400 WT = WT - TARE
14500 WERR = VAL("&H" + MID$(W$, 1, 1)) AND 8
14600 IF WERR THEN 14700 ELSE 14900
14700 REM LOCATE 21,1:PRINT "WEIGHT ERROR @ ";LUP%
14800 LOCATE 11, 1: PRINT "WEIGHT ERROR @ "; LUP%
```

```
14900 T$ = MID$(RX$, 47, 2) + MID$(RX$, 52, 2) + MID$(RX$, 57, 2)
15000 TS = (VAL("&H" + MID$(T$, 6, 1))) + VAL("&H" + MID$(T$, 5, 1)) * 16 + VAL("&H"
       + MID$(T$, 4, 1)) * 256 + VAL("&H" + MID$(T$, 3, 1)) * 4096
15100 TS = (TS + VAL("&H" + MID$(T$, 2, 1)) * 65536! + VAL("&H" + MID$(T$, 1, 1)) *
1048576!) * .00001953125#
15200 TD = TS - SAVEDTS: SAVEDTS = TS
15300 IF TD = 0 THEN TD = 1
15400 IF TD < 0 THEN TD = TD + 327.68
15500 M$ = MID$(RX$, 62, 2) + MID$(RX$, 67, 2)
15600 OLDMP = MP
15700 MP = VAL("&H" + MID$(M$, 4, 1)) + VAL("&H" + MID$(M$, 3, 1)) * 16 + VAL("&H"
       + MID$(M$, 2, 1)) * 256 + VAL("&H" + MID$(M$, 1, 1)) * 4096
15800 DELMP = MP - OLDMP
15900 IF (DELMP <= 0) OR (TD <= 0) THEN 16100
16000 MSPEED = DELMP / TD
16100 RETURN
16200 '**********************************************************
16300 PRINT #1, LENG$
16400 GOSUB 13100
16500 RETURN
16600 PRINT #1, STT$
16700 GOSUB 13100
16800 RETURN
16900 PRINT #1, RED$
17000 GOSUB 13100
17100 RETURN
17200 '**********************************************************
17300 'BUILD A NEW MOTOR SPEED COMMAND AND SEND IT TO THE PORT
17400 ITEMP% = -INT(I)
17500 IF ITEMP% < 0 THEN ITEMP% = 0
17600 MJR$ = HEX$(((ITEMP% \ 128) AND 127) OR 128)
17700 MNR$ = HEX$((ITEMP% AND 127) OR 128)
17800 CHA$ = HEX$(((ITEMP% \ 16384) AND 3) OR 12)
17900 SETF$ = "'83" + "0" + CHA$ + MJR$ + MNR$ + CHR$(3) + CHR$(16)
18000 PRINT #1, SETF$
18100 GOSUB 13100
18200 RETURN
18300 '**********************************************************
18400 'WRITE A RESET COMMAND TO THE PORT
18500 PRINT #1, REST$
18600 GOSUB 13100
18700 RETURN
18800 '**********************************************************
18900 'ENTRANCE FOR INITIALIZATION ONLY!!
19000 REM L=48:SAVEDL=L: DELAY=.1
19100 L = 45: SAVEDL = L: DELAY = .1
19200 TARE = 1000000!
19300 I = 0!: SAVEDI = I
19400 ANASET$ = CHR$(9) + CHR$(13) + CHR$(18) + "1"
19500 LDL$ = HEX$(L)
19600 RED$ = "'8B" + "00" + CHR$(3) + CHR$(16)
19700 REST$ = "'87" + "00" + CHR$(3) + CHR$(16)
19800 LENG$ = "'86" + "01" + LDL$ + CHR$(3) + CHR$(16)
19900 STT$ = "'86" + "00" + CHR$(3) + CHR$(16)
20000 RETURN
20100 '**********************************************************
20200 PRINT #1, ANASET$
20300 RETURN
20400 IF (CFLAG) THEN CURSTP = VDESIRE ELSE CURSTP = STARTI%
20500 LOCATE 7, 1: REM LOCATE 10,1
```

```
20600 PRINT LUP%, CURSTP, TS, WT, I; TAB(72); MPCTRL$(MPCTRL%): REM change
      mspeed to i
20700 RETURN
20800 '************ PRINT DATA IN A FILE ****************************
20900 INPUT "WHAT FILE NAME"; FILENME$
21000 OPEN "c:" + FILENME$ FOR RANDOM AS #2 LEN = 135
21100 FIELD #2, 10 AS ft$, 7 AS fx$, 9 AS fxh$, 7 AS fv$, 5 AS fk1$, 5 AS fk2$, 5 AS fi$, 7
      AS fms$, 7 AS fzres$, 9 AS fmph$, 7 AS fvmph$, 7 AS fmpres$, 5 AS fkmp1$, 5 AS
      FKMP2$, 7 AS FAC$, 7 AS Fat$, 7 AS Fvw$, 7 AS Fvmp$, 7 AS FVt$
21200 GET #2, 1
21300 F1 = VAL(ft$)
21400 PRINT "FILE NAME IS "; FILENME$, TIME$, DATE$
21410 PRINT "number of data samples: ", ft$
21412 LPRINT "number of data samples: ", ft$
21415 PRINT "length of data: ", fx$
21417 LPRINT "length of data: ", fx$
21420 PRINT "motor speed/weight correlation coefficient: ", fxh$
21422 LPRINT "motor speed/weight correlation coefficient: ", fxh$; "*e-3"
21425 PRINT "weight measurement noise variance: ", fv$
21427 LPRINT "weight measurement noise variance: ", fv$
21430 PRINT "weight feeding noise variance: ", fk1$
21432 LPRINT "weight feeding noise variance: ", fk1$
21435 PRINT "motor measurement noise variance: ", fk2$
21437 LPRINT "motor measurement noise variance: ", fk2$
21440 PRINT "motor feeding noise variance: ", fi$
21442 LPRINT "motor feeding noise variance: ", fi$
21445 PRINT "weight compensation factor: ", fms$
21447 LPRINT "weight compensation factor: ", fms$; "*e-3"
21450 PRINT "weight velocity gain: ", fzres$
21452 LPRINT "weight velocity gain: ", fzres$; "*e-3"
21455 PRINT "motor compensation factor: ", fmph$
21457 LPRINT "motor compensation factor: ", fmph$
21460 PRINT "motor velocity gain: ", fvmph$
21462 LPRINT "motor velocity gain: ", fvmph$
21465 PRINT "motor/weight correlation noise variance: ", fmpres$
21467 LPRINT "motor/weight correlation noise variance: ", fmpres$
21472 LPRINT "motor/weight combination parameter: ", fkmp1$; "*e-3"
21470 PRINT "motor/weight combination parameter: ", fkmp1$
21500 PRINT : PRINT " #   TIME  X_MEAS   X_HAT   V_HAT   K1   K2 M.SPD
      M.POS   ZRES"
21600 LPRINT : LPRINT " #   TIME  X_MEAS   X_HAT   V_HAT   K1   K2 M.SPD
      M.POS   ZRES"
21700 FOR I = 2 TO F1
21800 GET #2, I
21900 PRINT (I - 1); " "; ft$; " "; fx$; " "; fxh$; " "; fv$; " "; fk1$; " "; fk2$; ""; fi$; " "; fms$; "
      "; fzres$
22000   LPRINT (I - 1); " "; ft$; " "; fx$; " "; fxh$; " "; fv$; " "; fk1$; " "; fk2$; " "; fi$; " ";
        fms$; " "; fzres$
22100   LPRINT (I - 1); " "; FAC$; "    "; fms$; " "; fmph$; " "; fvmph$; " "; fkmp1$; " ";
        FKMP2$; " "; fi$; " "; fms$; " "; fmpres$; ""
22150   LPRINT (I - 1); " "; Fat$; "    "; Fvw$; " "; Fvmp$; "   "; FVt$
22200 LPRINT
22300 NEXT I
22400 CLOSE #278: STOP
22500 '****** COMPUTE DESIRED VELOCITY STANDARD DEVIATION ***********
22600 NSIG2 = NSIG * NSIG: MPNSIG2 = NSIG2
22700 VDSIG2 = VDSIG * VDSIG
22800 AA = VDSIG2 * T * T / NSIG2
22900 a = .5: AX = .5
23000 FOR K% = 1 TO 30
```

```
23100 fx = a ^ 3 / ((1! - a) * (2! - a))
23200 a = a - AX * (1! - AA / fx) / (3! / a + 1! / (1! - a) + 1! / (2! - a))
23300 IF a > 1! THEN a = .9
23400 IF a < 0! THEN a = .1
23500 B = a * a / (2! - a)
23600 NEXT
23700 VSIG2 = NSIG2 * B * B / (T * T * (1! - a))
23750 MPVSIG2 = MPNSIG2 * B * B / (T * T * (1! - a))
23800 VSIG = SQR(VSIG2)
23850 MPVSIG = SQR(MPVSIG2)
23900 RETURN
24000 '*************** KALMAN FILTER **********************
24100 IF SCONT2% = 1 THEN TD = TD - TDADD: SCONT2% = 0
24200 IF SCONT% = 1 THEN TD = TD + TDADD: SCONT% = 0: SCONT2% = 1
24300 XHATPRED = XHAT + TD * VHAT: VHATPRED = VHAT
24400 MPHATPRED = MPHAT + TD * VMPHAT: VMPHATPRED = VMPHAT
24500 REM IF LUP% >125 THEN XHATPRED=XHATPRED+VCPAST*SSWCOMPF
24600 XHATPRED = XHATPRED + VCPAST * SSWCOMPF
24700 MPHATPRED = MPHATPRED + VCPAST * MPSSWCOMPF
24800 REM IF LUP% >125 THEN VHATPRED=VHATPRED+VCPAST*SSVCGAIN
24900 VHATPRED = VHATPRED + VCPAST * SSVCGAIN
25000 VMPHATPRED = VMPHATPRED + VCPAST * MPSSVCGAIN
25100 XAHATPRED = XAHAT + TD * VAHAT: VAHATPRED = VAHAT
25150 XMPAHATPRED = XMPAHAT + TD * VMPAHAT: VMPAHATPRED = VMPAHAT
25160 XMPAHATPRED = XMPAHATPRED + VCPAST * MPSSWCOMPF
25200 XBHATPRED = XBHAT + TD * VBHAT: VBHATPRED = VBHAT
25250 XMPBHATPRED = XMPBHAT + TD * VMPBHAT: VMPBHATPRED = VMPBHAT
25260 XMPBHATPRED = XMPBHATPRED + VCPAST * MPSSWCOMPF
25270 VMPAHATPRED = VMPAHATPRED + VCPAST * MPSSVCGAIN
25280 VMPBHATPRED = VMPBHATPRED + VCPAST * MPSSVCGAIN
25300 ZRES = Z - XHATPRED
25350 ZVMEAS = (Z - ZPASTO) / TD
25360 ZPASTO = Z
25365 IF BRIDGE% = 0 THEN GOTO 25400
25367 IF BRIDGE% = 2 THEN GOTO 25393
25370 IF BCOUNT = 1 THEN VWRII = ZVMEAS ELSE VWRII = VWRII + KRI(BCOUNT) *
      (ZVMEAS - VWRII)
25375 LOCATE 19, 1: PRINT BCOUNT, " ", VWRII
25380 BCOUNT = BCOUNT + 1
25382 REM IF BCOUNT > BCountFlag THEN BRIDGE% = 2
25384 IF BCOUNT = BCOUNTFLAG AND VWRII > .5 * VHATTOTAL THEN PRINT "
      BRIDGE DETECTION       ": BRIDGE% = 2: REM test for 2nd detection
25386 IF BCOUNT = BCOUNTFLAG AND VWRII < .5 * VHATTOTAL THEN PRINT "NO
      BRIDGE         "
25388 IF BCOUNT = BCOUNTFLAG THEN BCOUNT = 1:
25390 GOTO 25400
25393 IF BCOUNT = 1 THEN VWRII = ZVMEAS ELSE VWRII = VWRII + KRI(BCOUNT) *
      (ZVMEAS - VWRII)
25394 LOCATE 19, 1: PRINT BCOUNT, " ", VWRII
25395 BCOUNT = BCOUNT + 1
25396 REM IF BCOUNT > BCountFlag THEN bridge% = 0
25397 IF BCOUNT = BCOUNTFLAG AND VWRII > .5 * VHATTOTAL THEN PRINT "
      BRIDGE DETECTION AND CONFIRMED    ": BRIDGE% = 0: REM stop testing
      for bridge
25398 IF BCOUNT = BCOUNTFLAG AND VWRII < .5 * VHATTOTAL THEN PRINT "
      FALSE ALARM, NO BRIDGE       ": BRIDGE% = 1: BCOUNT = 1: REM resume
      testing for bridge
25399 REM PRINT "bridge% "; bridge%
25400 MPRES = MP - MPHATPRED
25450 MPVMEAS = (MP - MPPASTO) / TD
```

```
25455 IF MPRES < -60000 THEN MPVMEAS = (MP + 65535 - MPPASTO) / TD
25460 MPPASTO = MP
25500 IF MPRES < -60000 THEN MPHATPRED = MPHATPRED - 65535!
25600 IF MPRES < -60000 THEN MPRES = MPRES + 65535!
25700 ZRESA = Z - XAHATPRED
25750 ZMPRESA = MP - XMPAHATPRED
25800 ZRESB = Z - XBHATPRED
25850 ZMPRESB = MP - XMPBHATPRED
25860 IF ZMPRESA < -60000 THEN XMPAHATPRED = XMPAHATPRED - 65535!
25865 IF ZMPRESA < -60000 THEN ZMPRESA = ZMPRESA + 65535!
25870 IF ZMPRESB < -60000 THEN XMPBHATPRED = XMPBHATPRED - 65535!
25875 IF ZMPRESB < -60000 THEN ZMPRESB = ZMPRESB + 65535!
25900 PP11 = P11 + (2! * TD * P12) + (TD * TD * P22): PP12 = P12 + TD * P22: PP22 = P22
      + VSIG2
25950 MPPP11 = MPP11 + (2! * TD * MPP12) + (TD * TD * MPP22): MPPP12 = MPP12 + TD
      * MPP22: MPPP22 = MPP22 + MPVSIG2
25955 IF LUP% = KXX% THEN CALPERT = 0
25960 GOTO 26000
25970 PERF% = 0: PP11 = PP11 + Q11: CALPERT% = 1
26000 PPZ = PP11 + NSIG2: Z2TH = 25! * PPZ
26050 MPPPZ = MPPP11 + MPNSIG2: MPZ2TH = 25! * MPPPZ
26100 K1 = PP11 / (PP11 + NSIG2): K2 = PP12 / (PP11 + NSIG2)
26150 KMP1 = MPPP11 / (MPPP11 + MPNSIG2): KMP2 = MPPP12 / (MPPP11 + MPNSIG2)
26200 P11 = (1! - K1) * PP11: P12 = (1! - K1) * PP12: P22 = PP22 - (K2 * PP12)
26250 MPP11 = (1! - KMP1) * MPPP11: MPP12 = (1! - KMP1) * MPPP12: MPP22 = MPPP22
      - (KMP2 * MPPP12)
26300 REM IF NOT MPCTRL% AND (lup% > KXX%) AND (zres*ZRES) > (9 * PPZ)) THEN
      CALFLAG% = 0
26305 REM IF calpert% = 1 THEN GOTO 26400
26310 K1A = K1A0: K2A = K2A0: K1B = K1B0: K2B = K2B0
26320 REM IF NOT MPCTRL% AND (lup% > KXX%) AND (((ZRES * ZRES) > (9 * PPZ))
      OR perf% = 1) THEN CALPERT = CALPERT + 1: ZRESA = 0: ZRESB = 0: k1a =
      k1a0: k2a = k2a0: k1b = k1b0: k2b = k2b0
26350 IF ((MPRES * MPRES) > (9 * MPPPZ)) THEN MPQ11 = 4 * MPRES * MPRES / 12!:
      MPPP11 = MPPP11+ MPQ11: GOTO 26000
26400 IF (ZRES * ZRES) > (9 * PPZ) THEN ZTHF% = 1: PERF% = 1: ZPERF% = 1' natural
      perturbation
26450 REM IF MPCTRL% AND (MPRES) > (3 * MPPPZ) THEN ZTHF% = 1
26460 IF ZTHF% = 1 THEN PERF% = 1
26470 IF (ZTHF% = 0 AND PERF% = 1 AND ZPERF% = 0) THEN ZPERF% = 1: CALPERT =
      CALPERT + 1: ZRESA = 0: ZRESB = 0: GOTO 25970
26500 IF ZTHF% = 0 THEN 27000
26600 REM LOCATE 16,69:PRINT "## ";LUP%;" ##":MP=-ABS(MP)
26700 LOCATE 16, 39: PRINT "## "; LUP%; " ##": MP = -ABS(MP)
26800 Q11 = 4 * (ZRES * ZRES / 12)
26850 REM MPQ11 = 0!
26860 CALPERT = CALPERT + 1: ZRESA = 0: ZRESB = 0
26900 PP11 = PP11 + Q11: ZTHF% = 0 : GOTO 26000
27000 XHAT = XHATPRED + K1 * ZRES: VHAT = VHATPRED + K2 * ZRES
27050 CALPERT% = 0: ZPERF% = 0
27100 MPHAT = MPHATPRED + KMP1 * MPRES: VMPHAT = VMPHATPRED + KMP2 *
      MPRES
27200 XAHAT = XAHATPRED + K1A * ZRESA: VAHAT = VAHATPRED + K2A * ZRESA
27250 XMPAHAT = XMPAHATPRED + K1A * ZMPRESA: VMPAHAT = VMPAHATPRED +
      K2A * ZMPRESA
27300 XBHAT = XBHATPRED + K1B * ZRESB: VBHAT = VBHATPRED + K2B * ZRESB
27350 XMPBHAT = XMPBHATPRED + K1B * ZMPRESB: VMPBHAT = VMPBHATPRED +
      K2B * ZMPRESB
27360 VWMPERROR = VHAT - VMPHAT * ACORR
27400 IF LUP% > KXX% THEN GOSUB 34400 'compute coeff for variance of residual
27500 IF CALFLAG% > 0 THEN VCPAST = 0: GOTO 30300
```

```
27600 REM VCERROR=VDESIRE-VHAT:VCPAST=VCTEMP:ZPAST=Z
27800 VHATW = (VHAT + VCTEMP * SSVCGAIN)
27810 VHATTOTAL = VHATW
27900 IF MPCTRL% THEN 28000 ELSE 28200
28000 VHATMP = VMPHAT + VCTEMP * MPSSVCGAIN
28110 AT = (ACORR * ACORR * MPP22 + SIGNC2) / (P22 + ACORR * ACORR * MPP22 +
      SIGNC2)
28115 REM AT = (ACORR * ACORR * MPP22) / (P22 + ACORR * ACORR * MPP22 +
      SIGNC2)
28120 VHATTOTAL = AT * VHATW + (1 - AT) * ACORR * VHATMP
28122 VWME = VHATW - ACORR * VHATMP: VWMESUM = VWMESUM + VWME:
      VWMECOUNT = VWMECOUNT + 1
28124 IF VWMECOUNT = 10 THEN VWMEAVE = VWMESUM / 10: ACORR = ACORR + .1
      * (VWMEAVE / VHATMP)
28126 IF VWMECOUNT = 10 THEN VWMESUM = 0: VWMECOUNT = 0
28128 REM IF LUP% = 400 THEN acorr = .9 * acorr
28200 VCERROR = VDESIRE - VHATTOTAL: VCPAST = VCTEMP: ZPAST = Z
28300 VCTEMP = CGAIN * VCERROR * CFLAG
28400 I = I + VCTEMP / FF
28500 REM IF LUP% > 175 THEN 29800
28550    IF LUP% > 145 THEN 29800
28600 VCTEMP = 0
28700 IF (LUP% MOD 10) <> 0 THEN 29700
28800 VCTEMP = 2 * IADD
28900 IADD = -IADD
29000 IF LUP% > 125 THEN 29700
29100 FAC = FAC * CORR: MPFAC = MPFAC * CORR
29200 IF IIFLAG% = 1 THEN VSUMLOW = VSUMLOW + VHAT: VMPSUMLOW =
      VMPSUMLOW + VMPHAT
29300 IF IIFLAG% = 1 THEN IILOWCOUNT = IILOWCOUNT + 1
29400 IF IIFLAG% = 0 THEN VSUMHIGH = VSUMHIGH + VHAT: VMPSUMHIGH =
      VMPSUMHIGH + VMPHAT
29500 IF IIFLAG% = 0 THEN IIHIGHCOUNT = IIHIGHCOUNT + 1
29600 IIFLAG% = (IIFLAG% + 1) MOD 2
29700 I = -(ABS(ITEMP) + IADD) / FF
29800 IF I > 0! THEN I = 0!: VCTEMP = 0!
29900 IF LUP% < 20 THEN 30200
30000 IF LUP% > 125 THEN 30200
30100 IF LUP% MOD 10 = 2 THEN SUM2 = SUM2 + ZRES * FAC: MPSUM2 = MPSUM2 +
      MPRES * FAC
30200    REM LOCATE 16,1:PRINT USING "######.### ";XHAT,VHAT,K1,K2,TD,ZRES
30300 LOCATE 12, 1: PRINT USING "######.### "; XHAT, VHAT, K1, K2, TD, ZRES
30400 LOCATE 15, 1: PRINT USING "######.### "; MPHAT, VMPHAT, KMP1, KMP2,
      TD, MPRES
30450 REM LOCATE 16, 1: PRINT USING "######.### "; XMPAHAT, VMPAHAT,
      ZMPRESA
30460 REM LOCATE 17, 1: PRINT USING "######.### "; XMPBHAT, VMPBHAT,
      ZMPRESB
30462 LOCATE 16, 1: PRINT "W-MP CORRELATION FACTOR : "; ACORR
30464 LOCATE 17, 1: PRINT "RATE COMBINING FACTOR   : "; AT
30466 LOCATE 18, 1: PRINT "VELOCITY_HAT_TOTAL      : "; VHATTOTAL
30470 LOCATE 9, 69: PRINT CALFLG$(CALFLAG%);
30500 IF LUP% <> 125 THEN 31200
30600 ii = INT((LUP% - 10) / 10)
30700 SSVCGAIN = ABS(VSUMHIGH / IIHIGHCOUNT-VSUMLOW /IILOWCOUNT) / 100
30800 MPSSVCGAIN = -ABS(VMPSUMHIGH / IIHIGHCOUNT - VMPSUMLOW /
      IILOWCOUNT) / 100
30900 REM SSWCOMPF=ABS((SUM2/II)/(100*SSVCGAIN))
31000 SSWCOMPF = ABS((SUM2 / ii) / (100))
31100 MPSSWCOMPF = -ABS((MPSUM2 / ii) / (100))
31200 RETURN
```

```
31300 'INITIAL FILTERING
31400 ZTHF% = 0: P11 = NSIG2: P22 = (2! * NSIG2 / (TD * TD)) + VSIG2: P12 = NSIG2
31450 MPP11 = MPNSIG2: MPP22 = (2! * MPNSIG2 / (TD * TD)) + MPVSIG2: MPP12 =
      MPNSIG2
31500 XHAT = Z: VHAT = (Z - ZPAST) / TD: XHATPRED = XHAT + VHAT * TD
31600 MPHAT = MP: VMPHAT = (MP - OLDMP) / TD: MPHATPRED = MPHAT + TD *
      VMPHAT
31700 VCERROR = 0
31800 GOTO 32200
31900 IF ZRES * ZRES > PPZ THEN RETURN
32000 DINIT = DINIT + 1
32100 IF DINIT = 1 THEN RETURN ' when DINIT=2 then initialize
32200 XAHAT = XHAT: VAHAT = VHAT: XBHAT = XHAT: VBHAT = VHAT
32250 XMPAHAT = MPHAT: VMPAHAT = VMPHAT: XMPBHAT = MPHAT: VMPBHAT =
      VMPHAT
32300 IF DINIT = 2 THEN KXX% = LUP% + 35: calstop% = KXX% + 100: REM dinit = 0
32400 RETURN
32500 REM INPUT "FILTER A: GAINS ";K1A,K2A
32600 K1A0 = .8: K2A0 = .4: CALPERT = 0
32700 REM INPUT "FILTER B: GSINS ";K1B,K2B
32800 K1B0 = .4: K2B0 = .2
32900 PRINT "noise computation time starts @50 ": KXX% = 250
33000 RETURN
33100 REM TDSUM = TDSUM + TD
33200 REM TDAVG = TDSUM/(lup% - kxx%)
33300 REM IF lup% <= kxx% + 10 THEN TDAVG = TDAVG + .05
33400 REM IF lup% <> kxx%+10 THEN GOTO 26500
33500 REM ** note the setting of t-ave
33600 REM TDAVG=1!
33700 REM DA=K1A*(4-2*K1A-TDAVG*K2A)
33800 REM DB=K1B*(4-2*K1B-TDAVG*K2B)
33900 REM aw=TDAVG*(2-K1A)/(K2A*DA)
34000 REM an=(4*K1A+2*TDAVG*K2A)/DA
34100 REM bw=TDAVG*(2-K1B)/(K2B*DB)
34200 REM bn=(4*K1B+2*TDAVG*K2B)/DB
34300 REM delta =an*bw-aw*bn
34400 IF CALFLAG% = 0 THEN RETURN
34500 ZRASUM = ZRASUM + ZRESA
34550 MPZRASUM = MPZRASUM + ZMPRESA
34600 ZRBSUM = ZRBSUM + ZRESB
34650 MPZRBSUM = MPZRBSUM + ZMPRESB
34660 VWMPESUM = VWMPESUM + VWMPERROR
34700 ZR2ASUM = ZR2ASUM + ZRESA * ZRESA
34750 MPZR2ASUM = MPZR2ASUM + ZMPRESA * ZMPRESA
34800 ZR2BSUM = ZR2BSUM + ZRESB * ZRESB
34850 MPZR2BSUM = MPZR2BSUM + ZMPRESB * ZMPRESB
34860 VWMPE2SUM = VWMPE2SUM + VWMPERROR * VWMPERROR
34900 REM IF lup% < kxx% + 10 THEN RETURN
35000 KYY% = LUP% - KXX%
35100 KYY = KYY%
35105 IF ((KYY - CALPERT) <= 0) THEN LPRINT "CYCLE "; LUP%; " STOP
      CALIBRATION": GOTO 37200
35110 IF KYY = 1 THEN VMPRI(KYY%) = MPVMEAS ELSE VMPRI(KYY%) =
      VMPRI(KYY% - 1) + KRI(KYY%) * (MPVMEAS - VMPRI(KYY% - 1))
35120 IF KYY = 1 THEN VWRI(KYY%) = ZVMEAS ELSE VWRI(KYY%)=VWRI(KYY% - 1)
      + KRI(KYY%) * (ZVMEAS - VWRI(KYY% - 1))
35200 AVEZRA = ZRASUM / (KYY - CALPERT)
35250 MPAVEZRA = MPZRASUM / KYY
35300 AVEZRB = ZRBSUM / (KYY - CALPERT)
35350 MPAVEZRB = MPZRBSUM / KYY
35360 VWMPEAVE = VWMPESUM / KYY
```

```
35400 ZAAVE(KYY%) = AVEZRA
35450 MPZAAVE(KYY%) = MPAVEZRA
35500 ZBAVE(KYY%) = AVEZRB
35550 MPZBAVE(KYY%) = MPAVEZRB
35560 VWMPEAVE(KYY%) = VWMPEAVE
35600 VARZRA = ZR2ASUM / (KYY - CALPERT) - AVEZRA * AVEZRA
35650 MPVARZRA = MPZR2ASUM / KYY - MPAVEZRA * MPAVEZRA
35700 VARZRB = ZR2BSUM / (KYY - CALPERT) - AVEZRB * AVEZRB
35750 MPVARZRB = MPZR2BSUM / KYY - MPAVEZRB * MPAVEZRB
35760 VWMPEVAR = VWMPE2SUM / KYY - VWMPEAVE * VWMPEAVE
35765 VWMPEVAR(KYY%) = VWMPEVAR
35770 SIGNC2 = VWMPEVAR
35800 SIGN2 = (VARZRA * BW - VARZRB * AW) / DELTA
35850 MPSIGN2 = (MPVARZRA * BW - MPVARZRB * AW) / DELTA
35900 SIGW2 = (-VARZRA * BN + VARZRB * AN) / DELTA
35950 MPSIGW2 = (-MPVARZRA * BN + MPVARZRB * AN) / DELTA
36000 REM ** note the special change in storrage
36100 ZRESA(KYY%) = VARZRA: ZRESB(KYY%) = VARZRB
36150 ZMPRESA(KYY%) = MPVARZRA: ZMPRESB(KYY%) = MPVARZRB
36200 SIGN2(KYY%) = SIGN2: SIGW2(KYY%) = SIGW2
36250 MPSIGN2(KYY%) = MPSIGN2: MPSIGW2(KYY%) = MPSIGW2
36300 TDAVG(KYY%) = TDAVG
36400 IF LUP% < calstop% THEN RETURN
36405 LPRINT "cycle: "; LUP%, "    number of calibration perturbations = "; CALPERT
36410 ACORRO = ACORR + VWMPEAVE(100) / VMPRI(100)
36420 ACORR = VWRI(100) / VMPRI(100)
36430 LPRINT "w-mp rate correlation factor "; ACORRO, ACORR
36500 SIGW2MIN = (.01 * VDESIRE) ^ 2
36600 REM IF SIGW2 > sigw2min THEN 37100
36603 LPRINT "weight-motor rate plant noise variance ", VWMPEVAR
36605 MPNSIG2 = MPSIGN2
36610 SIGW2O = SIGW2: SIGN2O = SIGN2
36620 MPSIGW2O = MPSIGW2: MPSIGN2O = MPSIGN2
36630 LPRINT "motor plant noise cal. "; MPSIGW2O, MPSIGW2
36650 REM IF MPCTRL% AND MPSIGW2 > sigw2min THEN 37100
36700 PRINT "minimum feeding variance: ", SIGW2MIN: LPRINT "minimum feedingvariance: ", SIGW2MIN
36750 SIGW2MPMIN = .0001: MPVSIG2 = SIGW2MPMIN
36760 LPRINT "minimum motor plant noise ", MPVSIG2
36800 SIGN2A = (ZRESA(100) - AW * SIGW2MIN) / AN
36850 MPSIGN2A = (ZMPRESA(100) - AW * SIGW2MPMIN) / AN
36900 SIGN2B = (ZRESB(100) - BW * SIGW2MIN) / BN
36950 MPSIGN2B = (ZMPRESB(100) - BW * SIGW2MPMIN) / BN
37000 SIGN2 = .5 * (SIGN2A + SIGN2B): SIGW2 = SIGW2MIN
37050 MPSIGN2 = .5 * (MPSIGN2A + MPSIGN2B): MPSIGW2 = SIGW2MPMIN
37060 VSIG2 = SIGW2MIN: NSIG2 = SIGN2: MPNSIG2 = MPSIGN2
37100 IF SIGW2O > SIGW2MIN THEN NSIG2 = SIGN2O: VSIG2 = SIGW2O
37120 LPRINT "On line weight measurement noise variance : ", NSIG2
37130 LPRINT "On line weight feeding noise variance : ", VSIG2
37150 IF MPSIGW2O > SIGW2MPMIN THEN MPNSIG2 = MPSIGN2O: MPVSIG2 = MPSIGW2O
37170 LPRINT "On line motor measurement noise variance : ", MPNSIG2
37180 LPRINT "On line motor feeding noise variance : ", MPVSIG2
37200 CALFLAG% = 0: KXX% = 10000: DINIT = 0: VWMPESUM = 0: VWMPE2SUM = 0
37220 ZRASUM = 0: ZRBSUM = 0: ZR2ASUM = 0: ZR2BSUM = 0
37240 MPZRASUM = 0: MPZRBSUM = 0: MPZR2ASUM = 0: MPZR2BSUM = 0
37260 RETURN
37300 LOCATE 17, 1: PRINT "new nsig2 and vsig2 "; : PRINT USING "    ####.#"; NSIG2, VSIG2
37400 CLS : INPUT "Do you wish to print residue and noise variance? "; Y$
37500 IF Y$ = "y" OR Y$ = "Y" THEN 37501 ELSE 20800
```

```
37501 LPRINT "rapid identification"
37502 LPRINT "cycle  motor rate   weight rate"
37503 FOR I = 1 TO 100
37505 LPRINT I, VMPRI(I), VWRI(I)
37507 NEXT I
37510 LPRINT "WEIGHT ANALYSIS :"
37520 LPRINT "*****************"
37600 PRINT " i    var-A    var-B    sign2    sigw2    var-Avar-B"; ""
37700 REM LPRINT " AN: ";AN," AW: ",AW : LPRINT " BN: ";BN," BW: ",BW
37800 REM LPRINT "DELTA: ";DELTA
37900 LPRINT " i    var-A    var-B    sign2    sigw2    T-avevar-A    var-B"
38000 FOR I% = 1 TO KYY%
38100 REM PRINT i%;" ";ZRESA(i%);" ";ZRESB(i%);" ";sign2(i%);"
        ";SIGW2(i%);"";TDAVG(i%)
38200 PRINT I%; USING "######.###"; ZRESA(I%), ZRESB(I%), SIGN2(I%), SIGW2(I%),
        TDAVG(I%), ZAAVE(I%), ZBAVE(I%)
38300 LPRINT I%; : LPRINT USING "######.###"; ZRESA(I%), ZRESB(I%), SIGN2(I%),
        SIGW2(I%), TDAVG(I%), ZAAVE(I%), ZBAVE(I%)
38400 NEXT I%
38405 LPRINT : LPRINT "MOTOR ANALYSIS :"
38410 LPRINT "*****************"
38415 PRINT " i    var-A    var-B    sign2    sigw2    var-Avar-B"; ""
38420 LPRINT " i    var-A    var-B    sign2    sigw2    T-avevar-A    var-B"
38430 FOR I% = 1 TO KYY%
38450 PRINT I%; USING "######.###"; ZMPRESA(I%), ZMPRESB(I%), MPSIGN2(I%),
        MPSIGW2(I%), TDAVG(I%), MPZAAVE(I%), MPZBAVE(I%)
38460 LPRINT I%; : LPRINT USING "######.###"; ZMPRESA(I%), ZMPRESB(I%),
        MPSIGN2(I%), MPSIGW2(I%), TDAVG(I%), MPZAAVE(I%), MPZBAVE(I%)
38470 NEXT I%
38480 LPRINT
38485 LPRINT "weight-motor rate plant noise error"
38488 FOR I% = 1 TO KYY%
38490 LPRINT I%; USING "######.###"; VWMPEAVE(I%), VWMPEVAR(I%)
38492 NEXT I%
38495 LPRINT
38500 PRINT "measurement noise variance: ", SIGN2(100)
38550 LPRINT "measurement noise variance: ", SIGN2(100)
38600 PRINT "feeding noise variance: ", SIGW2(100)
38700 REM ptiNT "measurement noise variance: ",SIGN2(100)
38800 LPRINT "feeding noise variance: ", SIGW2(100)
38900 IF SIGW2(100) > 0 THEN 39700
39000 REM ** minimum feeding noise = 0.5% * operating rate
39100 SIGW2MIN = (.01 * ITEMP) ^ 2: REM sigw2min=(.005*itemp)^2
39200 PRINT "minimum feeding variance: ", SIGW2MIN: REM prINT "minimum
        feedingvariance: ",SIGW2MIN
39300 SIGN2A = (ZRESA(100) - AW * SIGW2MIN) / AN
39400 SIGN2B = (ZRESB(100) - BW * SIGW2MIN) / BN
39500 SIGN2AVE = .5 * (SIGN2A + SIGN2B)
39600 PRINT "measurement noise variance: ", SIGN2A, SIGN2B, SIGN2AVE: LPRINT
        "measurement noise variance: ", SIGN2A, SIGN2B, SIGN2AVE
39700 REM II=INT((LUP%-10)/10)
39800 PRINT "number of cycles of averaging: "; ii
39900 LPRINT "number of cycles of averaging: "; ii
40000 PRINT "weight conversion factor: "; SUM2 / ii
40100 PRINT " average high velocity: ", VSUMHIGH / IIHIGHCOUNT
40200 PRINT " motor average high velocity: ", VMPSUMHIGH / IIHIGHCOUNT
40300 LPRINT " average high velocity: ", VSUMHIGH / IIHIGHCOUNT
40400 LPRINT " motor average high velocity: ", VMPSUMHIGH / IIHIGHCOUNT
40500 PRINT " vsumlow: ", VSUMLOW
40600 PRINT " average low velocity: ", VSUMLOW / IILOWCOUNT
```

```
40700 PRINT " motor average low velocity: ", VMPSUMLOW / IILOWCOUNT
40800 LPRINT " average low velocity: ", VSUMLOW / IILOWCOUNT
40900 LPRINT " motor average low velocity: ", VMPSUMLOW / IILOWCOUNT
41000 REM SSVCGAIN=ABS(VSUMHIGH/IIHIGHCOUNT-VSUMLOW/IILOWCOUNT)/100
41100 PRINT "small signal velocity command gain: "; SSVCGAIN
41200 PRINT "motor small signal velocity command gain: ", MPSSVCGAIN
41300 LPRINT "small signal velocity command gain: "; SSVCGAIN
41400 LPRINT "motor small signal velocity command gain: ", MPSSVCGAIN
41500 REM SSWCOMPF=(SUM2/II)/(100*SSVCGAIN)
41550 LPRINT "average weight to be compensated for square wave motor control signal ", SUM2
      / ii
41600 PRINT "small signal weight compensation factor: "; SSWCOMPF
41700 PRINT "motor compensation factor: ", MPSSWCOMPF
41750 LPRINT "average motor angle to be compensated for square wave motor control signal ",
      MPSUM2 / ii
41800 LPRINT "small signal weight compensation factor: "; SSWCOMPF
41900 LPRINT "motor compensation factor: ", MPSSWCOMPF
42000 VCOMP = 100 * SSVCGAIN
42100 WCOMP = SSWCOMPF * VCOMP
42200 PRINT "velocity compensation factor: "; VCOMP
42300 PRINT "weight compensation factor: "; WCOMP
42400 GOTO 20800
42500 STOP
```

1. A weigh feeding apparatus comprising:
   means for storing a quantity of material;
   means for discharging material from said means for storing, including a material discharge actuator;
   means for sensing a weight of said quantity of material or a weight of material being discharged;
   means for detecting a position or a velocity of said material discharge actuator;
   means for estimating a first rate of material being discharged according to sensed weight;
   means for estimating a second rate of material being discharged according to detected actuator position or velocity;
   means for combining said first and second rates to produce an estimated total rate of material being discharged; and
   means for controlling said material discharge actuator in accordance with said estimated total rate of material being discharged, to discharge material from said means for storing at a desired material discharge rate.

2. A weigh feeding apparatus comprising:
   means for storing a quantity of material;
   means for discharging material from said means for storing, including a material discharge actuator;
   means for sensing a weight of said quantity of material or a weight of material being discharged;
   means for detecting a position or a velocity of said material discharge actuator;
   means, including a model of at least one noise process which causes said sensed weight to differ from an actual weight of stored material or an actual weight of material being discharged, for estimating a first rate of material being discharged according to said sensed weight;
   means, including a model of at least one noise process which causes said detected position or velocity to differ from an actual position or velocity of said material discharge actuator, for estimating a second rate of material being discharged, according to said detected position or velocity of said material discharge actuator;
   means for combining said first and second rates to produce an estimated total rate of material being discharged; and
   means for controlling said material discharge actuator in accordance with said estimated total rate of material being discharged, to discharge material from said means for storing at a desired material discharge rate.

3. A weigh feeding apparatus comprising:
   means for storing a quantity of material;
   means for discharging material including a material discharge actuator;
   means for sensing a weight of said quantity of material or a weight of said material being discharged;
   means for measuring a position or a velocity of said material discharge actuator;
   means, including a first Kalman filter, for estimating a first rate of material being discharged, according to said sensed weight;
   means, including a second Kalman filter, for estimating a second rate of material being discharged, according to said measured position of velocity of said material discharge actuator;
   means for combining said first and second rates to produce an estimated total rate of material being discharged; and
   means for controlling said discharge actuator in accordance with said estimated total rate of material being discharged, to discharge material from said means for storing at a desired material discharge rate.

4. The weigh feeding apparatus as recited in claim 2 further comprising:
   means for adjusting said model of said at least one noise process which causes said sensed weight to differ from said actual weight; and means for adjusting said model of said at least one noise process which causes said sensed position or velocity of said material discharge actuator to differ from an actual position or velocity of said material discharge actuator.

5. A weigh feeding system as recited in claims 1, 2 or 3 wherein said means for combining includes means for weighting said first and second rates according to a combining factor.

6. A weigh feeding system as recited in claim 5, wherein said combining factor is variable according to a relative accuracy of said first and second rates to an actual material discharge rate.

7. A weigh feeding system as recited in claims 1, 2 or 3 wherein said means for estimating said second rate of material being discharged includes means for estimating an actuator rate based upon said sensed position or velocity of said material discharge actuator, and means for producing said second rate by multiplying said estimated actuator rate by a correlation coefficient.

8. A weigh feeding system as recited in claim 7, wherein said correlation coefficient is variable according to a relative accuracy of said first and second rates to said actual material discharge rate.

9. A weigh feeding apparatus as recited in claims 1, 2 or 3 further comprising:

means for detecting a bridge of material within said means for storing, including means for monitoring said first and second rates.

10. A weigh feeding apparatus comprising:

means for storing a quantity of material;

means for discharging material from said means for storing, including a material discharge actuator;

means for sensing a weight of said quantity of material or a weight of material being discharged;

means for detecting a position or a velocity of said material discharge actuator;

means for estimating the actuator position and rate according to sensed weight and detected actuator position or velocity;

means for estimating the correlation between the rate of material being discharged and the actuator rate according to sensed weight and detected actuator position or velocity;

means for estimating the weight according to sensed weight and detected actuator position velocity;

means for estimating the weight rate based on the estimated correlation coefficient and the estimated actuator rate; and means for controlling said material discharge actuator in accordance with said estimated total rate of material being discharged, to discharge material from said means for storing at a desired material discharge rate.

* * * * *